United States Patent [19]
Liu

[11] Patent Number: 5,825,759
[45] Date of Patent: Oct. 20, 1998

[54] DISTRIBUTING NETWORK SERVICES AND RESOURCES IN A MOBILE COMMUNICATIONS NETWORK

[75] Inventor: George Liu, Kista, Sweden

[73] Assignee: Telefonaktiebolaget LM Ericsson, Stockholm, Sweden

[21] Appl. No.: 506,119

[22] Filed: Jul. 24, 1995

Related U.S. Application Data

[63] Continuation-in-part of Ser. No. 329,608, Oct. 26, 1994, Pat. No. 5,572,221.

[51] Int. Cl.⁶ .............................. H04Q 7/38; H04L 12/28
[52] U.S. Cl. ........................... 370/331; 370/338; 379/60; 455/56.1
[58] Field of Search .............................. 370/38, 329, 331, 370/338, 349, 400, 410, 469, 473, 522; 379/59, 60, 63; 455/33.1, 33.2, 54.1, 56.1; 340/825.07, 825.52, 825.53; 395/200.01, 200.02, 200.03

[56] References Cited

U.S. PATENT DOCUMENTS

| | | | |
|---|---|---|---|
| 5,475,735 | 12/1995 | William et al. | 379/59 |
| 5,572,221 | 11/1996 | Marlevi et al. | 455/56.1 |
| 5,590,126 | 12/1996 | Mishra et al. | 370/329 |
| 5,621,798 | 4/1997 | Aucsmith | 340/825.07 |

OTHER PUBLICATIONS

Lennart Söderberg, Evolving An Intelligent Architecture For Personal Telecommunication, 1993, pp. 156–171.
Ichiro Iida et al., Duet: Agent–Based Personal Communications Network, Apr. 1995, vol. 1,ISS '95, pp. 119–123.
Subiro Kumar Biswas et al., A Connection Management Scheme For A Mobile Radio LAN, 1994, IEEE, pp. 100–107.
Rong N. Chang et al., Realizing Service Mobility For Personal Communications Applications, 1993, IEEE, pp. 173–176.
Charles Perkins et al., IMHP: A Mobile Host Protocol For The Internet, 1994, Computer Networks and ISDN Systems, pp. 479–491.
Daniel Barbará et al., Sleepers And Workaholics Caching Strategies In Mobile Environments, 1994, Proceedings of the 1994 ACM Sigmod International Conference on Management of Data, pp. 1–12.
N. Kamel & R. King, "Intelligent Database Caching Through the Use of Page–Answers and Page–Traces," *ACM Transactions on Database Systems*, vol. 17, No. 4, Dec. 1992 (p. 18, lines 18–22 of specification).
Hirschman, "Service Mobility/Transparency for Personal Communications", Universal Personal Communications, 1st International Conference, pp. 334–338, 1992.
Eckardt et al. Toward TMN–based service control –A Personal Communication Support System for Distributed Communication Environments, Telecommunications, (IEE Conf. Pub. 404), pp. 282–286, Mar. 1995.

*Primary Examiner*—Hassan Kizou
*Attorney, Agent, or Firm*—Burns, Doane, Swecker & Mathis, L.L.P.

[57] ABSTRACT

A full mobility data network architecture and method supports global wireless mobile data accessing. A Mobile Distributed System Platform, a mobility agent and a mobile-floating agent are provided for supporting service and resource mobility, and for distributing network services and resources closer to mobile users. In one aspect of the invention, a predictive mobility management algorithm determines where a mobile user or terminal is likely to be. Mobile-floating agents are then established at these locations to permit pre-connection and pre-arrangement of network services and resources for use by the user upon arrival. This allows mobile networks to more intelligently and dynamically provide services to mobile users. The Mobile-Floating Agent scheme can be used, for example, to build a mobile virtual distributed home location register (HLR) and visitor location register (VLR) in personal communication networks (PCNs), in order to reduce the call set up time. It can also be used for "soft data structure handover" for mobile computing.

37 Claims, 22 Drawing Sheets

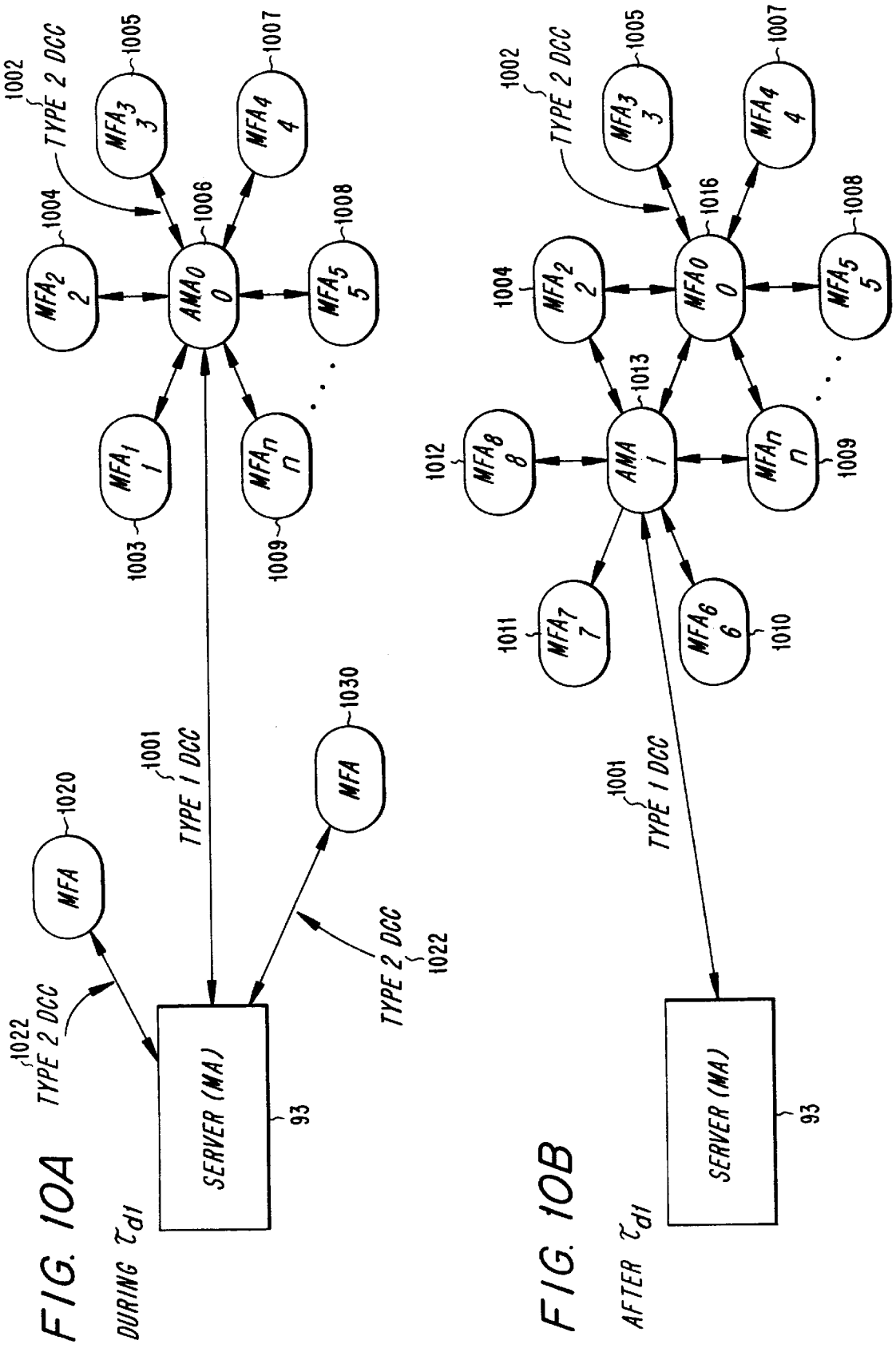
FIG. 10A DURING $\tau_{d1}$
FIG. 10B AFTER $\tau_{d1}$

DISTRIBUTING NETWORK SERVICES AND RESOURCES IN A MOBILE COMMUNICATIONS NETWORK

CROSS-REFERENCE TO RELATED APPLICATION

This is a Continuation-in-Part of U.S. patent application No. 08/329,608, entitled "Method and Apparatus for Detecting and Predicting Motion of Mobile Terminals," filed on Oct. 26, 1994, now U.S. Pat. No. 5,572,221.

BACKGROUND

The present invention relates to methods and apparatus for supporting data and service mobility to users of mobile networks.

With the freedom gained by increased access of external data through mobile user networks, productivity of computers and their users will be increased. Productivity will also be increased when mobile systems' users can efficiently access their data in addition to efficiently managing their voice calls. Generally mobile computer users require more access to network resources, such as files and databases, than do mobile telephone users. As a result, how to efficiently provide mobile data access is an important question.

Previous research in this area has resulted in a number of proposals that address network layer mobility support for mobile computing, including Mobile Internet Protocol (IP), sending packet data over mobile radio channels, and network layer host migration transparency. Although it is possible for a mobile computer to access data through the use of mobile networks, inefficient mobility support can result in performance problems such as poor throughput. Current cellular telephone networks are not efficient for wireless data access because they do not support data and service mobility. While users and their terminals are mobile, the fact that their data is configured statically in the system remains a problem that inhibits efficient data access.

In today's systems, databases, such as Home Location Registers (HLRs), are designed and configured centrally. Central databases are inefficient for a large number of mobile users because they do not support service mobility. While users and terminals may be mobile, the location of the data they wish to access is still primarily configured statically in the system.

Although some of the current research projects, such as the MObile NETwork (MONET) project, address the distributed database (DDB) issues, they are not designed to dynamically support service and resource mobility.

It is therefore an object of this invention to dynamically provide service and resource mobility in mobile wireless Local Area Networks (LANs) and cellular networks. It is another object to improve mobile data access and performance while reducing user latency.

SUMMARY

The foregoing and other objects are accomplished through use of a mobile floating (MF)-agent protocol in a mobile database system. The invention provides methods and apparatus for accommodating the "mobile nature" of mobile users by offering service and resource mobility. This is accomplished through intelligent service pre-connection, resource pre-allocation, and data-structure pre-arrangement. By deploying MF-Agents to decouple network services (such as user authentication data, registration data, etc.) and resources from the underlying network and moving them to follow their mobile users, the database becomes virtually distributed and aware of the location of the users.

By combining the Mobile-Floating agent functions with a method of predictive mobility management, the service and user data can be pre-connected and pre-assigned at the locations or cells to which the user is moving. This allows the users to immediately receive service and maintain their data structures with virtually the same efficiency as they could have at the previous location. It also provides "soft data structure handoff" capability.

In accordance with one aspect of the invention, network services and resources are distributed to a mobile user in a mobile communication system by providing the mobile user with a mobility (M)-agent executing on a home fixed host or router. It is then determined that the mobile user is or will be travelling to a destination that is outside a service area of the home fixed host or router, and a pre-assignment request is sent from the M-agent to at least one mobile floating (MF)-agent manager executing on a corresponding one of a like number of remote fixed hosts or routers located at the destination. Each MF-agent may include a set of processes, executing on the corresponding remote fixed host or router, for communicating and connecting with local resources and for managing a variable replicated secondary data cache on behalf of the M-agent. The M-agent may include a set of processes, executing on the home host or router, for communicating with each MF-agent. A mobile floating (MF)-agent is then established for use by the mobile user at each of the remote fixed hosts or routers, and the M-agent is used to send data or service information from the service area of the home fixed host or router to the MF-agent at each of the remote fixed hosts or routers. In this way, services and/or data may be pre-connected/pre-arranged at the mobile user's destination.

In accordance with another aspect of the invention, the step of establishing the MF-agent comprises, at each of the remote fixed hosts or routers, determining whether any preexisting MF-agent exists at the remote fixed host or router, and if not, then creating the MF-agent for use by the mobile user at the remote fixed host or router. Otherwise, the preexisting MF-agent is assigned for use by the mobile user at the remote fixed host or router.

In yet another aspect of the invention, one of the MF-agents performs acting mobility (AM)-agent functions in response to the mobile user having logged in at the remote fixed host or router that corresponds to the one of the MF-agents. An AM-agent performs many of the functions of an M-agent, including establishing additional MF-agents for use by the mobile user when he roams from the service area of the AM-agent, and pre-connecting and/or pre-arranging services and data at the locations of the additional MF-agents.

In accordance with yet another aspect of the invention, the step of sending the pre-assignment request from the M-agent to at least one mobile floating (MF)-agent manager executing on the corresponding one of the remote fixed hosts or routers located at the destination comprises the steps of identifying the corresponding remote fixed hosts or routers located at the destination and sending the pre-assignment request from the M-agent to each of the MF-agent managers executing on one of the identified corresponding remote fixed hosts or routers. Further, the step of identifying the corresponding remote fixed hosts or routers located at the destination comprises the steps of: (1) determining a mobility density m, wherein m is a number of cells that have been passed by the mobile user during time $\tau_m$; (2) defining a circularly shaped geographic location centered at a current location of the mobile user and having a radius d=int (h*m*$\tau_m$), wherein d is a service distance and h is a hierarchic factor defined by the number of cells service by one MF-Agent Manager; and (3) identifying the remote fixed hosts or routers that are located within the circularly shaped geographic location.

In an alternative embodiment of the invention, the step of identifying the corresponding remote fixed hosts or routers located at the destination comprises the steps of: sending a message from the mobile user to the M-agent, wherein the message designates the destination; and using the M-agent to identify the MF-agent manager that is executing on a remote fixed host or router that is located at the destination. In another aspect of the invention, the message may further include a designated time that the mobile user will be at the destination. In this case, the additional step of transferring data from the M-agent to a secondary cache of the MF-agent is performed, wherein the time of the data transfer has a predetermined relationship with the designated time. For example, the predetermined relationship may require transfer of the data prior to the designated time.

In yet another alternative embodiment of the invention, the step of identifying the corresponding remote fixed hosts or routers located at the destination comprises the steps of: (1) determining a mobility density m, wherein m is a number of cells that have been passed by the mobile user during time $\tau_m$; (2) defining a circularly shaped geographic location centered at a current location of the mobile user and having a radius d=int(h*m*$\tau_m$), wherein d is a service distance and h is a hierarchic factor defined by the number of cells serviced by one MF-agent manager; (3) predicting a movement track (MT) or movement circle (MC) of the mobile user; and (4) identifying the remote fixed hosts or routers that are located on the predicted MT or MC within the circularly shaped geographic location.

In still other aspects of the invention, the disclosed techniques may be applied in wireless local area networks (LANs) as well as in cellular communications systems. Further, a mobile-application programming interface (mobile-API) is provided for providing a common programming interface to mobile applications, the mobile-API including a mobile distributed system platform for managing location-sensitive information, and for performing predictive mobility management functions.

BRIEF DESCRIPTION OF THE DRAWINGS

The features and advantages of the invention will be understood by reading the following description in conjunction with drawings, in which:

FIGS. 10A and 10B illustrate two types of cache consistencies;

DETAILED DESCRIPTION

Figure 1:
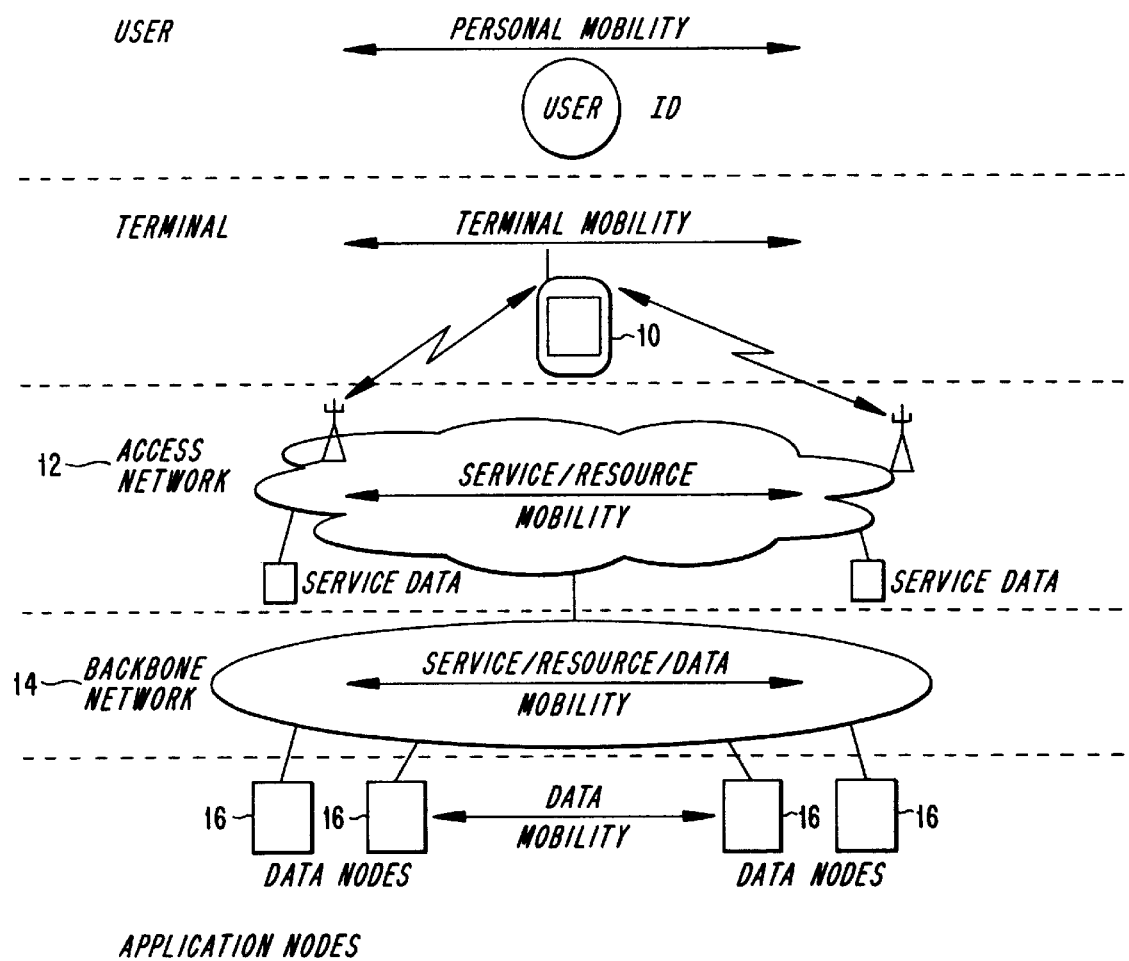
FIG. 1 depicts a diagram of a Mobility Architecture.

The various features of the invention will now be described with respect to the figures, in which like parts are identified with the same reference characters.

A Comprehensive Mobility Architecture

With the proliferation of mobile communication into everyday life, work environments have become decentralized. As a result, users can now take work wherever mobile terminals allow them to. Unfortunately, while computers and their support hardware have become increasingly mobile, there has not been any significant attempt to increase the mobility of the service and data access required by these mobile systems. The present invention solves these and other problems by providing a comprehensive mobility architecture for supporting service and resource mobility for data networks, resulting in a fully mobile architecture.

The need for global mobility and for connectivity of mobile data access can be satisfied through integration of existing and future communication networks.

FIG. 1 illustrates a state of the art wireless data network environment comprising, among other things, mobile terminals 10, access networks 12, backbone networks 14, and application nodes 16. The access 12 and backbone 14 networks may operate in accordance with a wide variety of protocols and standards.

Typically access networks 12 may include cellular networks, personal communications networks (PCNs), and wireless LANS having a spread of bandwidths that range in magnitude from 10 Kb/s at the low end, as in outdoor macrocells, up to 2–10 Mb/s for indoor picocells. Backbone networks 14 can include Internet or high speed transport networks (e.g., fiber optic cables with Fiber Distributed Data Interface (FDDI), Asynchronous Transfer Mode (ATM), Dynamic Transfer Mode (DTM), etc.). In addition, application nodes 16 can be provided by the backbone network 14 or via databases and file servers, or by value-added network providers, such as library information bases, video servers, news servers, and the like (not shown).

Because of the variety of different systems and networks that are accessible to a mobile user, as outlined above, service and resource mobility provided by these networks is becoming increasingly important for providing efficient mobility management. Service mobility is the mobility of various services (logic/data) in the underlying access 12 and backbone 14 networks. Resource mobility is the mobility of the resources, such as system data/programs, user data, user programs, etc., in the underlying network. Both service and resource mobility must be adequately provided in order to meet the quality of service requirements of the mobile users.

In order to meet the increasing demands that user mobility is placing on these networks, conventional mobility management capabilities must be further extended to manage service and resource mobility. The importance of these two additional types of mobility is significant for efficient mobility management support.

Figure 2:
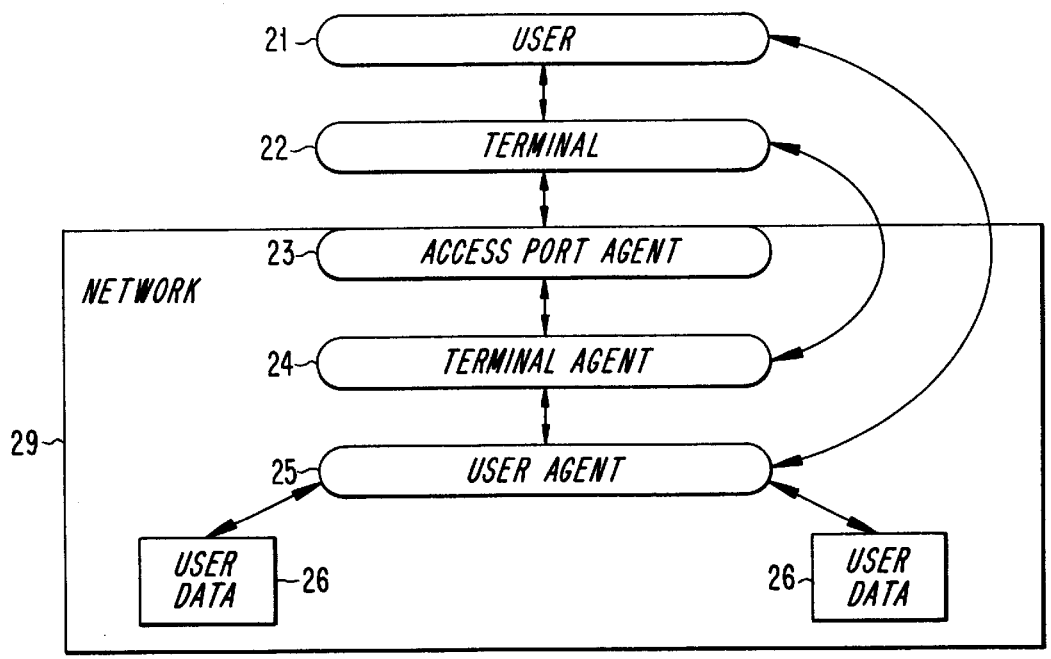
FIG. 2 illustrates a user Agent Model.

To efficiently support mobility, the user agent model as outlined in Lennart Söderberg, "Evolving an Intelligent Architecture for Personal Telecommunication," ERICSSON Review, No. 4, 1993, hereby incorporated by reference, is introduced. Referring now to FIG. 2, each user 21 and terminal 22 is represented in the network by corresponding agents 24 and 25 respectively. These agents 24 and 25 contain all service logic and service data related to the user 21 or terminal 22, and control all communication sessions of the user 21 or terminal 22. This model provides the basis for providing service and resource mobility in accordance with one aspect of the invention.

Figure 3:
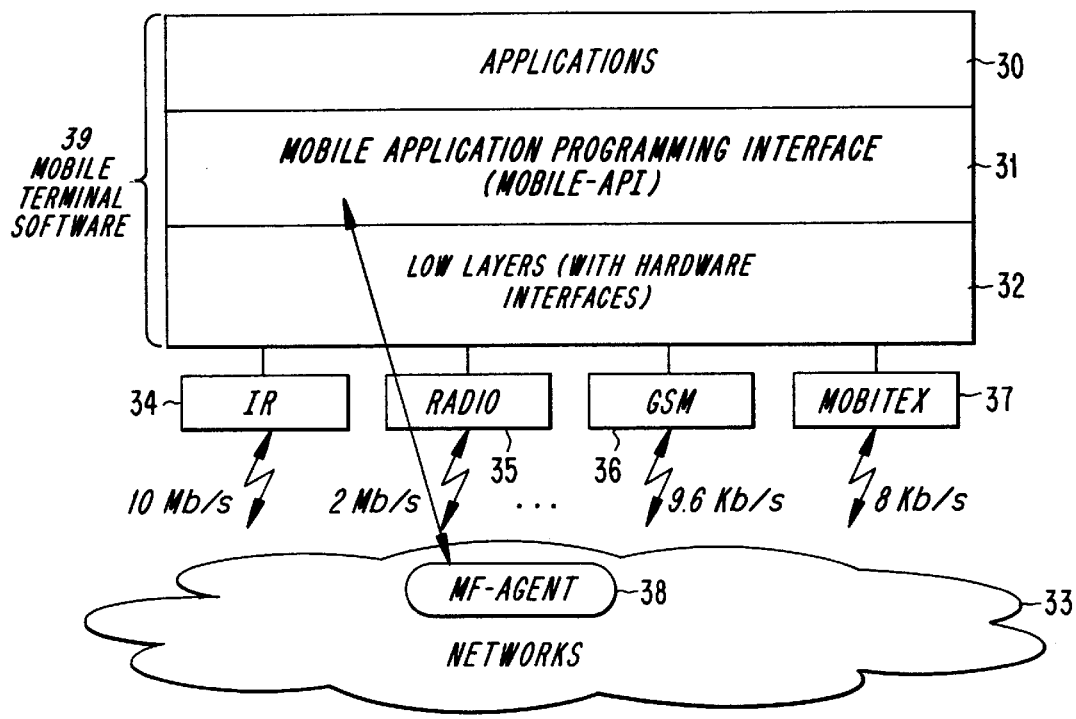
FIG. 3 shows a Mobile API with Mobile Floating Agent.

Referring now to FIG. 3, mobile terminal software 39 in accordance with one aspect of the invention is shown. Both a Mobile-Applications Programming Interface (API) 31 and a Mobile Floating (MF)-agent 38 are provided to cope with the varying bandwidth and connectivity of different links (34, 35, 36, 37) at different locations and to efficiently support service and resource mobility. The relationship between the Mobile-API 31 and a number of applications in a mobile multi-link environment will now be illustrated in greater detail.

Different networks 33 may co-exist at the same or different locations. This can cause problems when a mobile user is trying to communicate with one of the networks 33. For instance while Mobitex 37 provides 8 kb/s radio link for a wide coverage area, the data speed of an indoor infrared (IR) link 34 can be up to 10 Mb/s. The Mobile-API 31 with its MF-agent provides user transparent mobility in such an environment having varying bandwidth and link connectivity.

At the lower layers of the mobile terminal software 39, hardware interfaces 32 are provided for communication with the links 34, 35, 36, 37. These lower layers also support the well known Mobile Internet Protocol (IP). The Mobile-API 31 is used to support terminal mobility. The Mobile API 31, along with an MF-agent 38 in the network, supports mobile multimedia applications.

Figure 4:
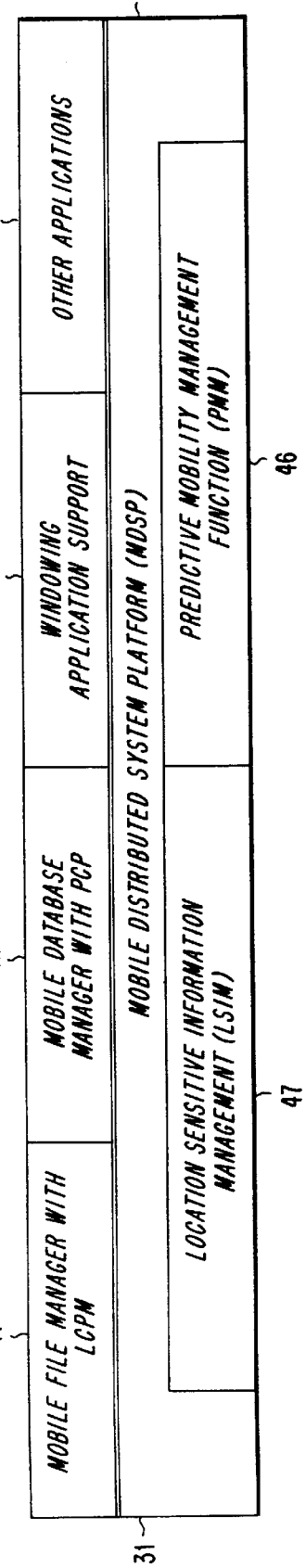
FIG. 4 is an example of a Mobile-API Model.

Turning now to FIG. 4, a preferred embodiment of the Mobile-API invention is shown. The Mobile-API 31 has a mobile distributed system platform (MDSP) 45 that includes Location-Sensitive Information Management functions (LSIM) 47 and Predictive Mobility Management Functions (PMF) 46. On top of the MDSP 45, several function blocks are designed to support particular applications, for instance, mobile-distributed file systems 41, mobile distributed databases 42, windowing 43 and other applications 44.

The key difference between a mobile terminal and a fixed one is that the mobile terminal supports communications with a mobile system or other terminals while it is changing location. However, one may typically expect to encounter different types of connectivities (different radio/IR bandwidths) and services/resources (e.g., servers, printers, programs, etc.) at different locations in a wireless network environment. In order to ensure efficient management of location-sensitive information, applications must determine the characteristics of the communication channel and services provided by the networks and/or be notified of changes. Therefore, location-sensitive information, identifying the services or resources (including hardware and software resources, network connectability and types of communication protocol available, etc.) provided by the systems or networks at a defined location (i.e., geographical area), must be efficiently managed.

The LSIM 47 in the MDSP 45 is designed to manage the location-sensitive information and map the information to the different services offered by the mobile infrastructure at different geographical locations. Furthermore, the LSIM 47 is also responsible for informing both the applications 30 and their supporting agents 38 about any change of location of the mobile terminal 22 in addition to providing dynamical service connections. For example, suppose that a network, with a distributed file system, consists of several servers distributed in different geographic areas. When a mobile terminal moves from a location near server A to a location near server B, the LSIM 47 should inform both the server B and a cache manager in the mobile terminal, that server B is the nearest file server, should a file be needed.

In one embodiment of the invention, the most likely destination of a user is determined through the use of Predictive Mobility Management Functions (PMM) 46, which are also located in the MDSP 45. The PMM 46 has two parts:

location prediction functions and virtual-distributed floating agent assignment functions (FAA). The FAA functions assign the MF-agent to different locations according to a location prediction. In addition, the PMM 46 aids the Mobile API 31 in establishing service pre-connection and service/resource mobility. A more detailed discussion of the Location Prediction Functions in the PMM 46 can be found in co-pending U.S. patent application No. 08/329,608, entitled "Method and Apparatus for Detecting and Predicting Motion of Mobile Terminals," filed on Oct. 26, 1994, hereby incorporated by reference.

Mobile Floating Agents

Figure 5:
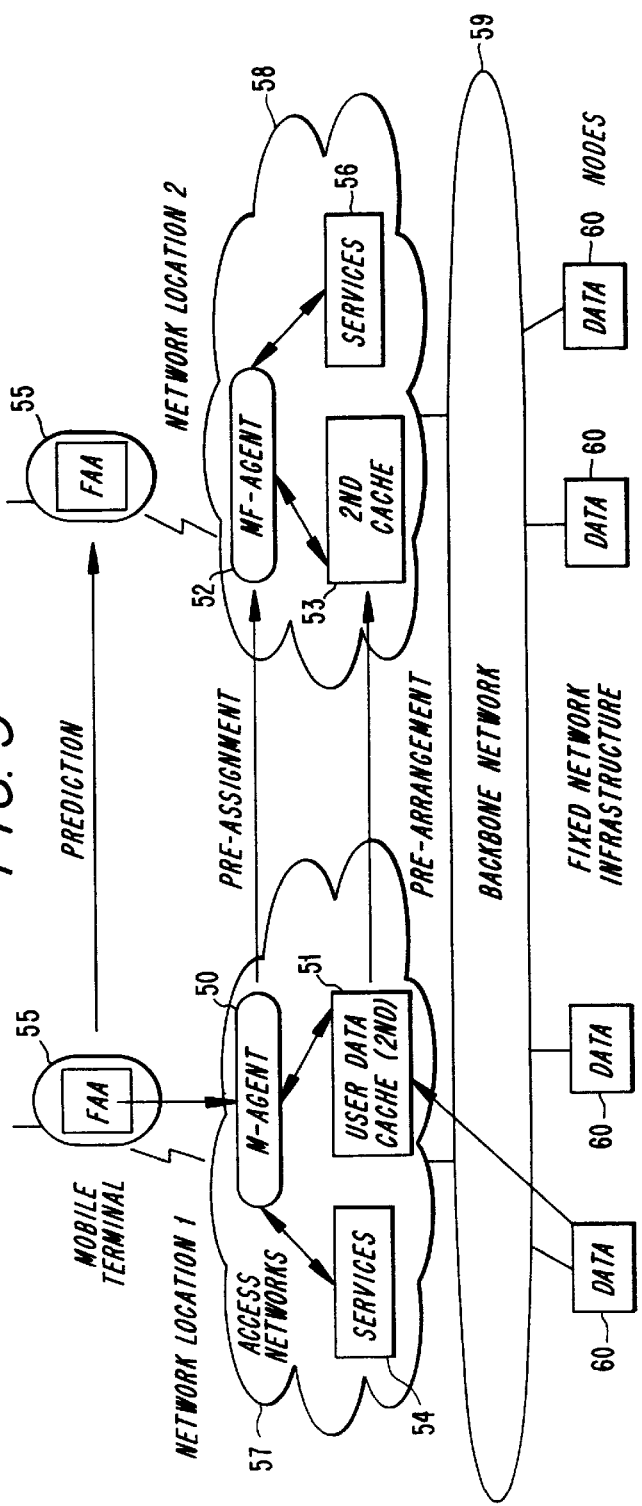
FIG. 5 illustrates M-agent and MF-agent support service pre-connection and resource pre-arrangement.

Referring to FIG. 5, in order to distribute network services and resources closer to mobile users, in other words, to provide service and resource mobility in wireless data networks, a mobile-Floating Agent (MF-agent) 52 and a Mobility Agent (M-agent) 50 are used. An M-agent 50 is preferably a software entity executing on a home fixed host or router, including a set of processes that communicates with and pre-assigns an MF-agent 52 to remote fixed hosts or routers on behalf of a mobile terminal 55. An MF-agent 52 is preferably a software entity executing on a remote fixed host or mobile support router (MSR), including a set of processes that can communicate and connect with the local host or MSR resources. The MF-agent 52 also manages a variable replicated secondary data cache 53 on behalf of the M-agent 50.

The significant advantage of having the support of the M-agent 50 and MF-agent 52 is that the service logic and resources are not bound to the underlying network. Therefore, the M-agent 50 and MF-agent 52 are free to follow the mobile users. By using predictive mobility management to predict where the user will be, as described in U.S. patent application No. 08/329,608, filed on Oct. 26, 1994, incorporated by reference, the MF-agent 52 pre-connects services, pre-arranges the secondary cache 53 and prefetches data from the home user cache 51 to be placed in the secondary cache 53, in a fashion similar to that in which a travel agency would pre-arrange a hotel room or other services for a user when that user is travelling.

Mobile Floating Agent Protocol

The MF-agent 52 is assumed to have basic mobility support from the network layer, via a protocol such as Mobile-IP, otherwise known as IP mobility support.

Figure 6:
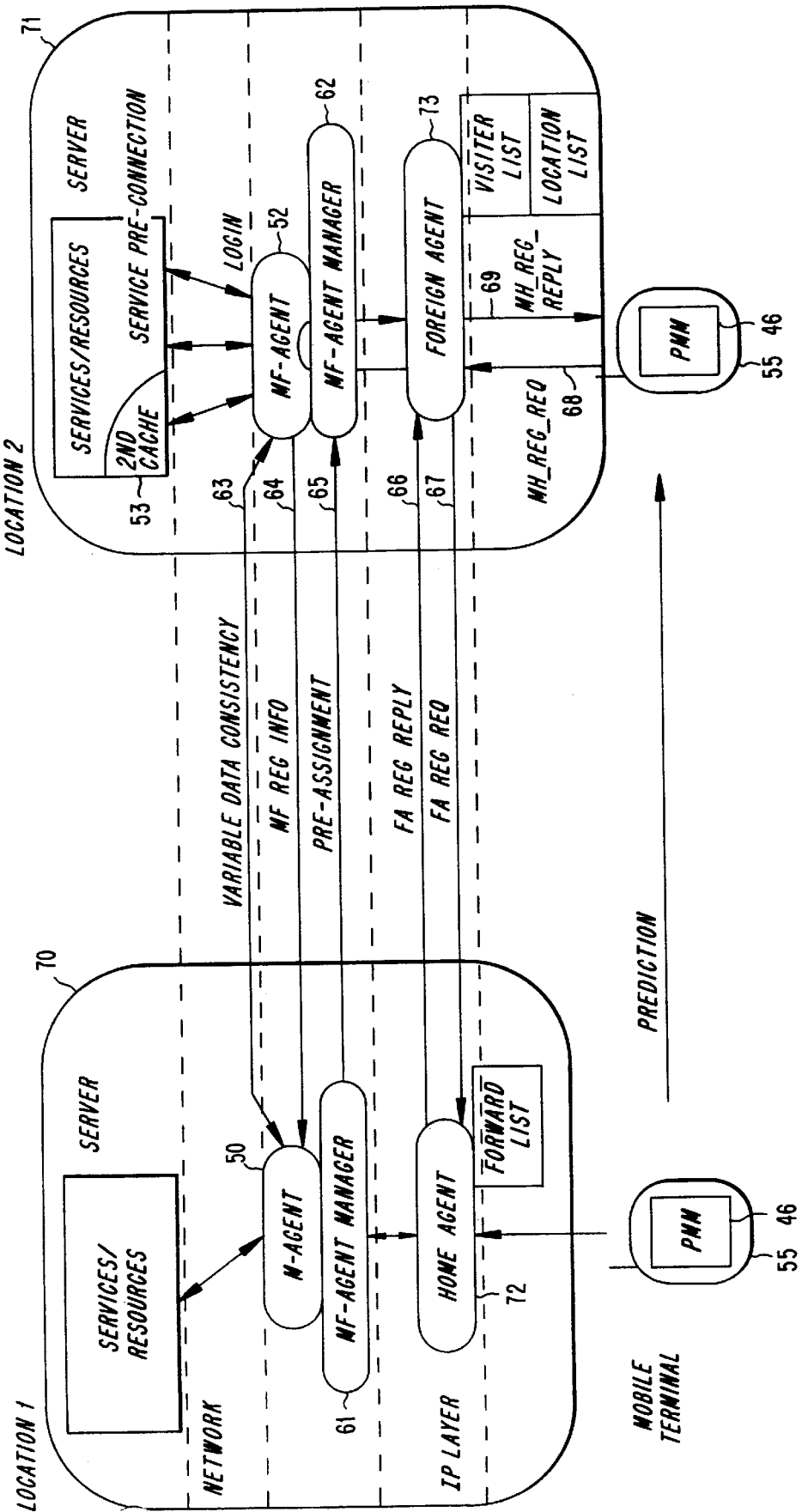
FIGS. 6 and 7 illustrate a Mobile Floating Agent Protocol.
Figure 7:
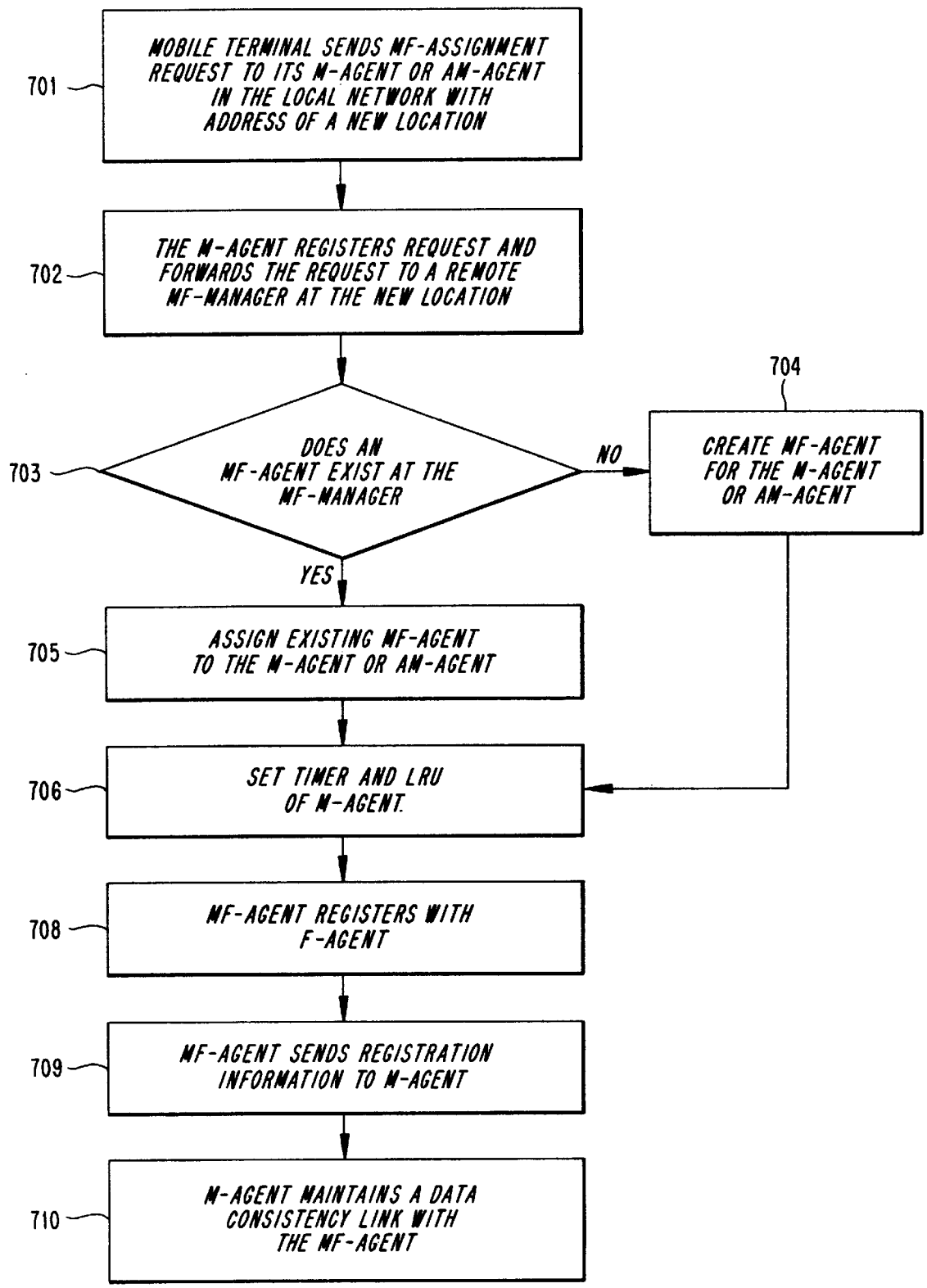

A preferred embodiment of the MF-agent pre-assignment protocol is depicted in FIGS. 6 and 7. The MF-agent manager 61, 62 provides a common base which supports MF-agent 52 creation and assignment (i.e., establishment). The M-agent 50 is a representative of the user 21 in the network and is responsible in part for creating, deleting and managing the MF-agents on behalf of mobile users. An M-agent 50 requests creation or assignment of MF-agents 52. As shown in FIG. 7 a mobile terminal 55 sends an MF-agent assignment request to its M-agent 50, in the local network, with an address of a new location it is travelling to (701). The new location may be one that has been explicitly provided by the user 21, or it may be one predicted by the PMM functions 46. The assignment request is a request to establish (i.e., alternatively create or pre-assign) an MF-agent 52 at the location that the mobile terminal 55 will be travelling to and thus have any necessary services and data ready for the mobile terminal, when it arrives at the new location. The M-agent 50 then registers the request and forwards the request 65 to the remote MF-agent manager at the new location (702). Upon receiving the MF-assignment request at the MF-agent manager 62 from the M-agent 50, the MF-agent manager 62 determines if there is an existing MF-agent at the new location (703). If there is an already existing MF-agent 52, the MF-agent manager 62 assigns the existing MF-agent to the requesting M-agent 50 (705). If there is no existing MF-agent then the MF-agent manager 62 creates a new MF-agent 52 for the requesting M-agent 50 (704). After the MF-agent 52 is alternatively created or assigned, a timer and least recently used (LRU) parameter are set for the MF-agent 52 (706) (the uses of the timer and the LRU parameter are explained in detail below).

After the MF-agent 52 is alternatively created or assigned, it registers itself with the Foreign Agent 73 (F-agent) (708). The MF-agent 52 then sends an MF-assignment reply back to the M-agent 50 containing the registration information (709). The M-agent 50 then sends a reply back to the mobile terminal 55 and maintains a data consistency link 63 with the MF-agent 52 (710).

The data consistency link 63 is used to send updated data from the M-agent 50 to the secondary cache 53 in order to maintain data consistency in the secondary cache 53 of the MF-agent 52. The data consistency link 63 can also have different priority levels for updating the information in the secondary cache 53 of the MF-agent 52. If the time needed for the mobile terminal 55 to reach the new location is considered to be relatively long, (for example, a mobile terminal moving from New York City to Europe), then the data consistency link 63 can have a low priority requiring less frequent updating of the secondary cache 53. If the time needed to reach the new location is shorter, (for example, driving within New York City), then the data consistency link 63 would be given a higher priority requirement for more frequent updating. Data consistency and caching methods are described in more detail below.

Figure 8:
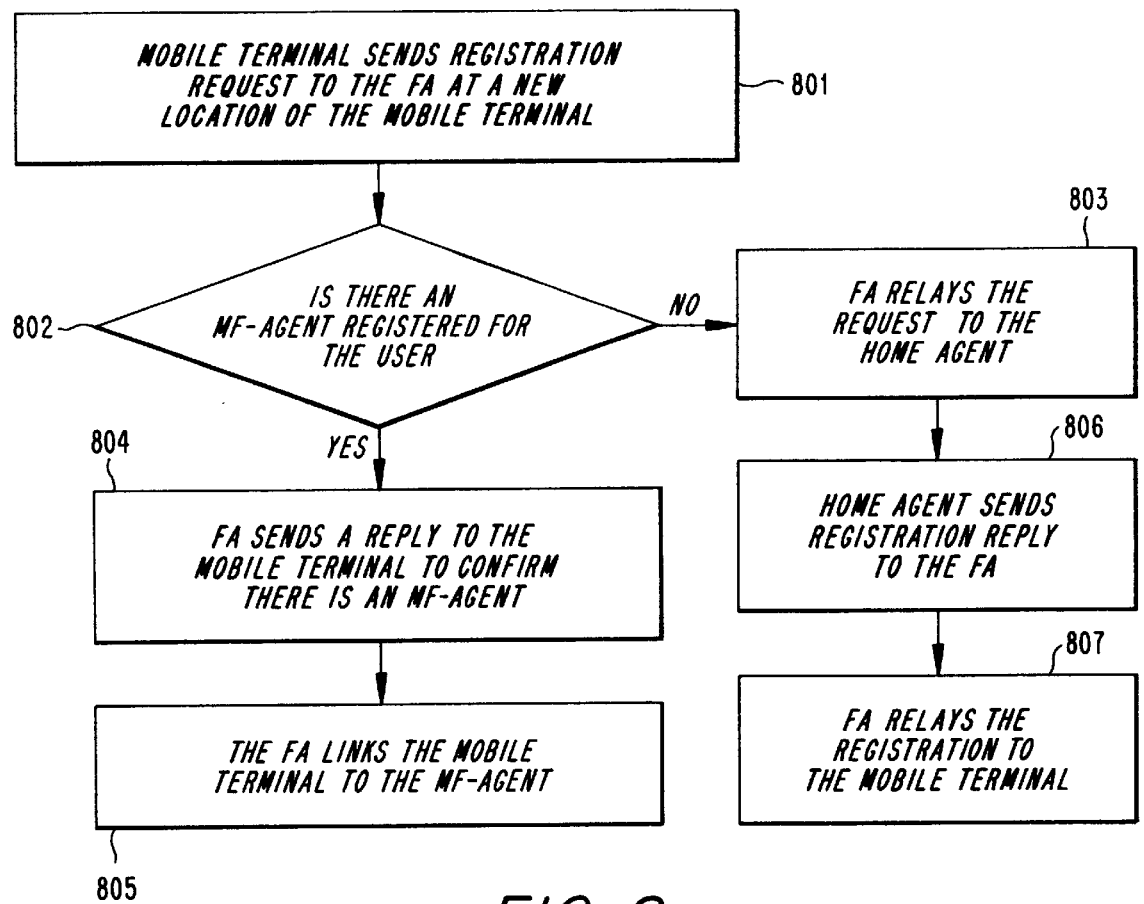
FIG. 8 shows Mobile Terminal registration at a new location.

Referring now to FIG. 8, when the mobile terminal 55 reaches the new location, it registers with the MF-agent 52 that has been created or assigned for it there (801). This is accomplished by sending an MF-agent registration request 68 to the F-Agent 73 at the new location to begin the registration process. The F-agent 73 checks to see if there is a corresponding MF-agent 52 for the mobile terminal 55 (802). If there is an MF-agent 52, the F-agent 73 confirms this and activates the MF-agent 52 (804). The F-agent 73 then links the mobile terminal 55 to the MF-agent 52 (805). In accordance with another aspect of the invention, the MF-agent now performs as an acting M-agent (AM-agent) for the mobile terminal 55, performing the same function as an M-agent at the new location. It should be noted that the M-agent 50 at the home location will always be the M-agent and is responsible for control of all communication sessions. The M-agent 50 also maintains data consistency between the home resources (data/files) and its pre-assigned MF-agents and its AM-agent on behalf of its user, the M-agent 50 being able to maintain more than one data consistency link 63. (An AM-agent may also maintain multiple data consistency links 63 with other MF-agents 52. This arrangement is shown in FIG. 10 and described in more detail below). Once a mobile terminal 55 moves to yet another new location and a new MF-agent 52 is activated as a new AM-agent, it sends a message back to the previous AM-agent, thereby, deactivating it. At this point the deactivated AM-agent once again becomes an MF-agent 52.

In previously used methods, when a user logged-in at a remote location, the F-Agent 73 would relay a request to the home agent 72 at the user's home location (803). The home agent 72 would then have to provide the services or data and reply back to the F-agent 73 with the requested information (806). The F-agent 73 would then send the requested information to the mobile terminal (807). In mobile systems this is inefficient and could result in delays for the user. By contrast, through use of the MF-agent 52 as described herein, an MF-agent 52 is waiting with the needed data or services when the user logs in at the remote location, and the user notices no difference in the provided services even though the user has changed location.

After a predetermined period of time, if the mobile terminal 55 never arrives at the predicted location, or, if after being deactivated the mobile terminal 55 never returns to the MF-agent's service area, the MF-agent 52 is preferably destroyed. In order to perform this function, each MF-agent 52 is also provided with a timer for maintaining a parameter ($t_{mf}$) that determines the MF-agent's 52 lifetime. The timer is initialized and started when the MF-agent 52 is assigned or created. This timer is re-set and stopped when the MF-agent 52 becomes an AM-agent. Once the AM-agent is deactivated, thereby causing it to become an MF-agent 52 again, the timer is restarted.

In accordance with another aspect of the invention, each MF-agent 52 also preferably maintains a Least Recently Used (LRU) parameter ($l_{mf}$) which is initialized when the MF-agent 52 is assigned or created. The LRU parameter provides a priority index for shared resources (e.g., disk space for secondary cache, memory, etc.) with other MF-agents 52 at the same location. If the resources at this location have to be reclaimed, then one or more MF-agents 52 having the highest LRU parameter are chosen as victims and destroyed in order to free the needed resources.

Mobility-aware Dynamic Caching and Prefetching Method

According to another aspect of the invention, a method of hierarchic Mobility-Aware Dynamic (MAD) cache management is provided, for dynamically managing and updating the secondary cache of the MF-agent 52. The following subsections describe the basic principles of the hierarchic MAD caching, Dynamical Caching Consistency (DCC) and Mobility-aware Caching Management.

Hierarchical MAD Caching Consistency

Figure 9:
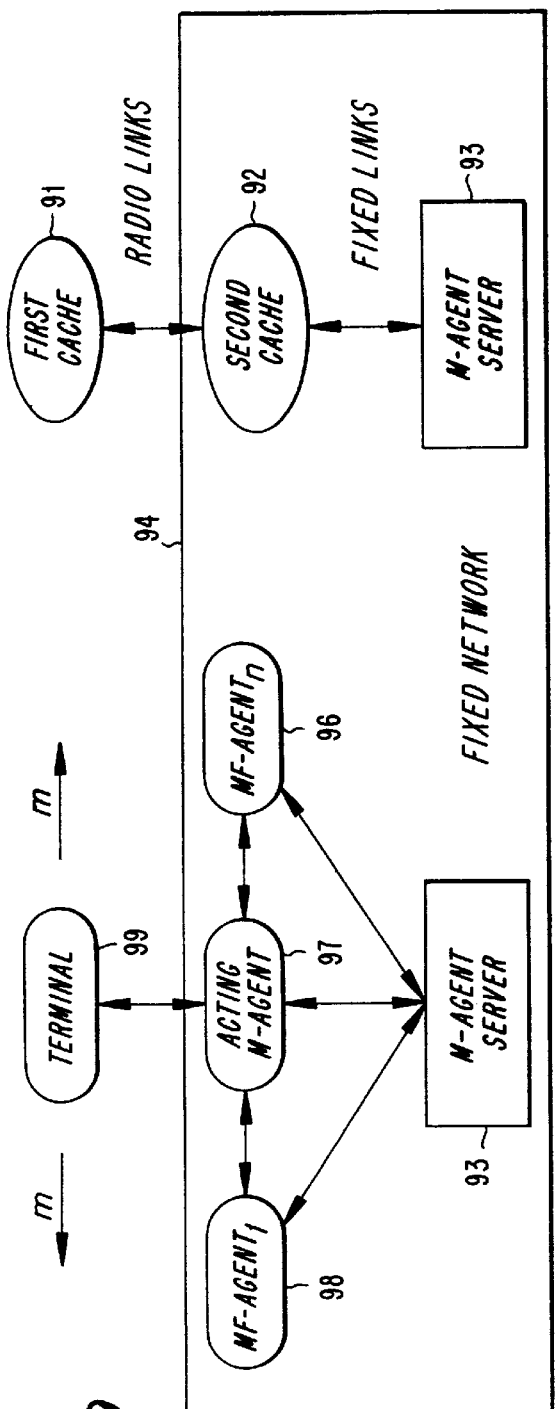
FIG. 9 shows a hierarchy of two classes of caches.

FIG. 9 illustrates a MAD Caching Scheme in accordance with one embodiment of the invention. The MAD Caching Scheme is designed preferably in a hierarchy with two classes of caches: a primary cache 91 implemented at the terminal and a secondary cache 92 that is managed by the MF-agent.

Two classes of cache consistency methods are employed to maintain data consistency. A first class utilizes a dynamic cache consistency (DCC) method to maintain data consistency between a server and the MF-agents 52, including any AM-agents. A second class includes a mobility-aware cache coherence method, wherein the MF-agent 52 keeps track of any items cached by its mobile user and is responsible for broadcasting an invalidation report if any of the items are changed. Barbara's "invalidation reports broadcasting" cache consistency strategies, as described in D. Barbara & T. Imielinski, "Sleepers and Wolkaholics: Caching strategies in Mobile Environments," *Mobidata, an interactive Journal of mobile computing*, Vol. 1, No. 1, Nov. 1994, incorporated herein by reference, are used to maintain dynamic cache consistency between the primary cache and the secondary cache. The "invalidation reports broadcasting" method when combined with PMM functions, described above, to only broadcast each individual mobile user's invalidation reports to the mobile user's current geographic location (mobility) area. Because the MF-agent assignment methods can guarantee that a mobile terminal 55 will be in an area covered by the MF-agent 52, the mobile terminal 55 will receive the invalidation reports as long as the terminal has not been disconnected or failed. In addition, the MF-agents 52 can maintain a user profile for recording disconnection behavior information of the mobile terminal 55. This information is sent to the MF-agents 52 by the mobile terminals 55 when the MF-agents 52 are created or assigned. From time to time, the MF-agents 52 can change their broadcasting strategies according to the user mobility and working behavior.

Figure 11:
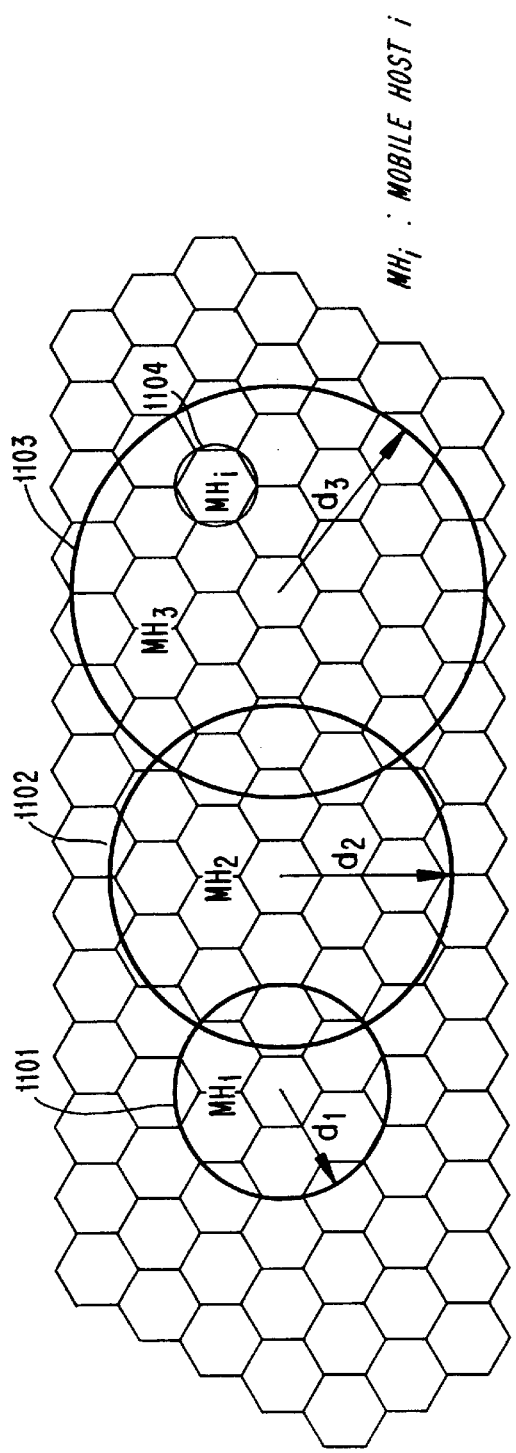
FIG. 11 shows an example of invalidation broadcast report areas for different user mobilities.

Using MF-agents 52 for the broadcast invalidation reporting has several important advantages. The first advantage is that the invalidation reports are only broadcast to the location area where the mobile terminal 55 is located. Typically, the location-area is dynamically changed according to the mobility behavior factor of each individual mobile terminal 55. For example, a cell's associated MSR would not broadcast cache invalidation information for a mobile terminal 55 if the MSR was certain that the mobile terminal 55 was not currently in the cell (i.e., there is no MF-agent 52 for the mobile terminal 55 in this cell). Thus, the total number of invalidation reports broadcasted at each cell can be reduced. FIG. 11 shows an example of invalidation report broadcast areas for different mobile terminals. These areas may overlap, change over time and move when the mobile terminals change mobility behavior during each time period $\tau_m$.

A second advantage of using MF-agents 52 for broadcast invalidation reporting is that the invalidation database is only replicated at the cell or station within each user's dynamic location area. This can reduce the update overhead for fewer mobile users because their corresponding dynamic location areas will be small, for example 1101 or 1104. One can think of this as an information radius of the mobile terminal, which decreases as the certainty of the user's location increases.

An additional advantage is that with the support of the MF-agents 52 in the fixed network, individualized dynamic invalidation reports can be defined for each mobile terminal 55 according to the terminal's mobility behavior or the cache consistency required during each time period $\tau_m$.

Furthermore, through the use of the MF-agents 52, a replicated database is created for each cell or MSR, corresponding to each individual mobile terminal 55. The database is dynamically replicated about the mobile user's location and changes according to the user's mobility. By utilizing the PMM functions of the MDSP and the MF-agent protocol, whenever a user moves to another location, the user will always find the data that is needed replicated at that location.

The secondary caches of the MF-agents 52 can be constructed so that they perform the same functions as a Page-answer Database, detailed in N. Kamel & R. King, "Intelligent Database Caching Through the Use of Page-Answers and Page-Traces," *ACM Transactions on Database Systems*, Vol. 17, No. 4, December 1992, hereby incorporated by reference, which is derived from a database at the server. Each time a query is issued by a mobile terminal 55, it is first evaluated in the secondary cache of the mobile unit's associated MF-agent or AM-agent. Then any remaining information not contained in the secondary cache is obtained through the corresponding M-agent 50 from the database at the server. For example, consider a set of n named data items which consists of the Page-Answers $D_1=\{p_{i_1}, p_{i_2}, \ldots, p_{i_n}\}$ with $D_{i_1}=\{p_{i_1}, p_{i_2}, \ldots, p_{i_{n-1}}\}$ prestored in the secondary cache. A query $q_i=\{<p_{i_1}\text{-}q_{i_1}>, <p_{i_2}\text{-}q_{i_2}>, \ldots, <p_{i_n}\text{-}q_{i_n}>\}$ can be fully reconstructed by evaluating $p_{i_n}$ from the server database and $D_{i_1}$ from the secondary cache. A similar construction is used for the primary cache of the mobile terminal 55.

Dynamical Caching Consistency

According to another aspect of the invention, the Dynamical Cache Consistency (DCC) method dynamically maintains two types of cache consistencies. The two types of cache consistencies are illustrated in FIGS. 10A and 10B. The first type of dynamic cache consistency is maintained between the M-Agent and the AM-agent and is labelled a type 1 DCC 1001. The type 1 DCC is created between an M-agent and an MF-agent when the user logs in at the MF-agent, thereby causing the MF-agent to become an AM-agent. The type 1 DCC is preferably a high priority link used to update cache information quickly. A second type of DCC is used between the AM-agent and its MF-agents (1002) or between the M-agent and its MF-agents (1022), and is labelled a type 2 DCC 1002, 1022. The type 2 DCCs 1002, 1022 are preferably lower priority links used to update the caches of associated MF-agents. The number of MF-agents 1003, . . . , 1009, 1020, 1030 and their relation to the AM-agent 1006 and to the MA 93 as shown in FIG. 10A is just an example. In practice, the MF-agents 1003, . . . , 1009, 1020, 1030 can exist in any number, and can be distributed in different patterns depending on the MF-agent assignment method used, such as Movement Circle (MC) and Movement Track (MT) patterns.

In one preferred embodiment, the type 1 DCC 1001 uses a "call-back" consistency policy. The M-Agent 93 is responsible for keeping track of the cache status information of its current AM-agent 1006. To avoid frequent changes in the association with different agents as the terminal moves back and forth, the old AM-agent 1006 (FIG. 10A; also MFA$_0$ 1016 in FIG. 10B) is preferably used to forward the type 1 DCC 1001 to the new AM-agent 1013. The association between an M-Agent 93 and the old AM-agent 1006 will last for a period of time $\tau_{d1}$, even when the mobile terminal 55 has moved to another location. The value of $\tau_{d1}$ is given by $$\tau_{d1} = \frac{h\alpha_{d1}}{m}$$

where $\alpha_{d1}$ is a delay factor, h is a hierarchy factor and m is the mobility density of a user during time period $\tau_m$.

The new AM-agent 1003 informs the M-Agent 93 to establish the type 1 DCC 1101 association with it after a time period $\tau_{d1}$. The M-Agent 93 is only allowed to have a type 1 DCC association with one of the MF-agents associated with each mobile user; all other type 1 DCCs 1001 associated with the old AM-agents 1006 will be canceled after the M-agent forms an association with a new AM-agent 1013 (formerly MFAI 1003 in FIG. 10A). For example, suppose that the mobile terminal 55 is moved from the location 0 (i.e., the current AM-agent 1006) to location 1, as shown in FIG. 10B. Then, MF-agent, 1003 becomes the new AM-agent 1013 and the previous AM-agent 1006 at location 0 becomes an MF-agent 1016 once more. The association between the M-Agent 93 and the agent at the location 0, i.e., the MF-agents 1016 (formerly AM-Agent 1006), will not be changed during the time period $\tau_{d1}$. Instead, the MF-agent 1016 transmits the type 1 DCC to and from the current AM-agent 1013. After expiration of the time period $\tau_{d1}$, the new AM-agent 1013 informs the M-Agent 93 that it wishes to establish an association with the M-Agent 93 and, in response, the MA-gent 93 cancels the old association with the former AM-agent, now MF-agent 1016.

In contrast to the type 1 DCC, the type 2 DCC preferably uses a delayed "write-update" consistency policy for an MF-agent group (i.e., the group of MF-agents that have been created, either by an M-agent 93 or an AM-agent 1006, for use by a particular user). The MF-agent group is created in accordance with any one of a number of MF-agent assignment methods, which are discussed in greater detail below. The AM-agent 1006 and M-agent 93 will each multicast or group broadcast the latest update to their respective MF-agent groups after a time interval $\tau_{d2}$. The T$_{d2}$ is preferably given by $$\tau_{d2} = \frac{h\alpha_{d2}}{m}$$

where $\alpha_{d2}$ ($\alpha_{d2} \geq 1$) is a delay factor, h is a hierarchy factor and m is the mobility density of a user during time period $\tau_m$. The reason for delay $\tau_{d2}$ is that there isn't any need to update the caches of the MF-agents 1003, ..., 1009, 1020, 1030 (other than the cache of the AM-agent 1006) before 1/m, in other words, the time needed for a mobile user with mobility density m to move from one cell to another. During the delay time $\tau_{d2}$ there may be several updates. Only the latest update is group-cast to the MF-agents in the group.

MF-Agent Assignment

The above sections have outlined the MF-agent protocols and DCC methods. However, in order to use an MF-agent it is also necessary to identify the corresponding fixed hosts or routers located at the destination where the MF-agents need to be created or assigned.

Radius-d Assignment Method

Consider a geographic area covered by cells (such as those defined by a cellular network), with each cell being serviced by an MSR or fixed host. Let $\lambda$ be the average move rate of a mobile user, where average move rate is defined by the average number of new MSRs which have been passed by the mobile user during a relatively long unit time, such as a day, month or year. Let m be the mobility density factor of the mobile user, where mobility density factor is defined as the number of new cells that have been passed by the mobile terminal 55 during time $\tau_m$. Let s denote service rate, which is defined by the number of MF-agents that service each unit movement of the mobile users. Then:

$$s = \frac{d}{h \cdot m \cdot \tau_m}$$

where d is the service distance, h is a hierarchic factor preferably defined by the number cells serviced by one MF-Agent manager, and $\tau_m$ is a period of time in which the mobility density factor, m, is sampled.

To ensure that there is at least one MF-agent supporting each user whenever the user moves, the service rate should be $s \geq 1$, that is, $d \geq h \cdot m \cdot \tau_m$.

The Radius-d Assignment Method

In accordance with one embodiment of the invention, the MF-agent assignment (without any movement prediction) may be performed as follows.

First, the mobility density is calculated during each time interval $\tau_m$. Next, a circle, corresponding to a geographic area centered at a current location of the mobile user, is determined. The circle preferably has a radius d=int (h·m·$\tau_m$). Finally, the remote fixed hosts or routers that have MF-agent managers and which are located within this circle are assigned MF-agents for supporting the mobile user. (This assignment may include the step of creating new MF-agents at those fixed hosts or routers having no preexisting MF-agents available for assignment.) If a mobile user reaches the boundary of the circle, then the process is repeated from the beginning. This is referred to throughout this description as the "Radius-d" assignment method, as all remote fixed hosts or routers are assigned an MF-agent if they are determined to be within the "Radius-d".

The MT/MC/d Assignment Method

The Radius-d assignment method described above can guarantee that the service rate $s \geq 1$, but it may not be optimal for every configuration. For highly mobile users, "Radius-d" assignment may not be efficient because a large background traffic overhead may be generated in the fixed network due to a large number of MF-agents being assigned within a circle having a large radius d. Another problem is that some of the MF-agents assigned in the circle may never be used. This is an inefficient use of resources. A better method of assignment is to combine the MF-agent assignment with the predictive mobility management (PMM), as fully described in previously mentioned co-pending U.S. patent application No. 08/329,608, filed on Oct. 26, 1994, incorporated herein by reference. Instead of assigning MF-agents to every remote fixed host or router within the circle of radius d, this assignment method predicts the most likely movement of the mobile user within the circle. The MF-agents are only assigned to those remote fixed hosts or routers within the circle that are additionally within a predicted Movement Track (MT) or Movement Circle (MC). As an MT or MC can cover a very long physical distance, only the states or cells in the MT or MC within the distance d are assigned each time. This method is referred to throughout this description as the MT/MC/d assignment method. This method provides a more efficient allocation of MF-agents than the bare Radius-d method.

To state this more succinctly, the MT/MC/d assignment method is as follows:

1. Calculate the mobility density m during each time interval $\tau_m$.
2. Define a circle centered at the current location of the mobile terminal having a radius d. (Assume that $\alpha_d=1$, i.e., 100% confidence that the user is within the circle with radius d during $\tau_m$). The radius d is given by $$d=int(hm\tau_m)$$

3. Only assign MF-agents to those MSRs that are located on those portions of the predicted MT or MC that are within the circle;
4. If at the boundary of the circle, repeat from step 1.

One should note that the assignment spaces of the Radius-d and MT/MC/d are really spheres, rather than circles, since the user's motion is in three dimensions not simply planar. But for simplicity, only the 2D case is considered here. One of ordinary skill in the art can easily derive the 3D case from the 2D case. For the 3D case, the Radius-d simply becomes the radius of a sphere instead of a circle, the sphere being centered at the location of the mobile terminal.

Point-to-Point Assignment Method

The above described assignment methods are primarily concerned with one-to-multi-point types of assignment. However, MF-agents can also be implemented by users to make explicitly point-to-point (PTP) assignments. For example, suppose a user is going to Oslo, Norway from Stockholm, Sweden. The user simply needs to inform the M-agent of his intended destination. It would also be useful for him to include his expected time of arrival. The point-to-point assignment method will then assign an MF-agent to a remote fixed host or MSR located in Oslo and maintain a dynamic data consistency data link with it. During the time the user is traveling from Stockholm to Oslo, the data will be dynamically pre-arranged at Oslo. Having arrived at Oslo, the user can log-in to the MF-agent, just the same as in Stockholm. The user will not see any difference in the computing environment despite the change of location.

Thus in accordance with a preferred embodiment of the invention, the point-to-point assignment method utilizes only two input parameters: the "future-location" (network address) and the time ($t_e$) to be expected at that location. However, the time ($t_e$) can be considered optional. If a time parameter is not specified, the assignment is assumed to have a low priority and will be performed whenever the network is free.

Three MF-agent assignment methods have been described. The Radius-d assignment guarantees a 100% service rate ($s \geq 1$) for any type of random movement by users, but it may generate a lot of background system overhead. By comparison, the point-to-point assignment method may not generate as great an overhead as the Radius-d assignment method does, but it requires explicit "future-location" information in order to provide good service. The MT/MC/d assignment algorithm provides a compromise solution by using the predictive mobility management information to reduce the overhead while avoiding the need for explicit future location information.

Performance Evaluations

Next, the performance of the MF-agent scheme with different assignment methods is evaluated.

Mobile data accesses primarily comprise two important operations, namely, the read and write operations. A read operation reads data from a remote server or database and a write operation writes data back to the server. Therefore, the performances of a read and write operation in the different MF-agent assignment methods are analyzed and evaluated below.

To analyze the performance gain without loss of generality, let the total number of cells be N and also assume that N>>m·$\tau_m$, where m·$\tau_m$ is the total number of new cells that a user with a mobility density m has passed during time interval $\tau_m$, and $\tau_m$>>$\tau_{c3}$, where $\tau_{c3}$ is the time required to send a message between two MF-agents. It is also assumed that the LRU parameter associated with each MF-agent has an exponential distribution, i.e., $1_{mf}=e^t$. It is further assumed that the mobile user is initially at his home network when m=0.

For this example simulation, it is also assumed that the on-line costs are twice as significant as the background costs and the same as the wireless and wired ones. The costs of a wireless link today are about twenty times higher than that of a wired link. The higher this ratio is, the less significant the MF-agent assignment overhead. It is believed that this ratio will go down to about two-to-one in the future. Therefore, the above assumption is the worst case situation. The "on-line costs" include the cost of a system for making a data access by a user and the cost of the user to have to wait for data, i.e., the delay costs from the user's point of view, while the background costs only include the cost of utilizing the system to send data. The cache miss rate of the second cache is assumed to be 15% and that of the first cache is 30%. N=100, T=100 minutes and h=1.

With Point-to-Point Assignment

The Point-to-Point Assignment (PTP) assignment method is the simplest one. Because it requires the user to explicitly provide the location-destination information, the PTP assignment is independent of the mobility density of the users. The MF-agent model for the MF-agent assignment is shown in FIG. 12.

Figure 12:
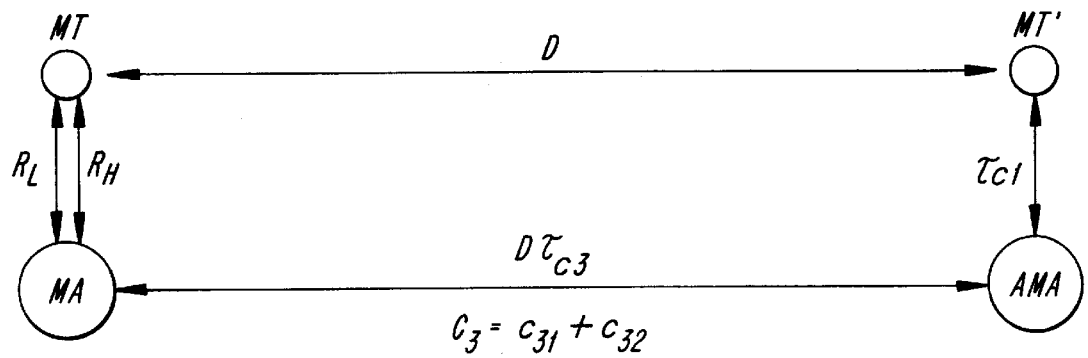
FIG. 12 depicts the Point-To-Point MF-agent Assignment Model.

With the above assumptions, the percentage reduction in delay of read and write operations in a system with a PTP assignment is a function of the relative assignment distance, as shown in FIG. 12.

The relative assignment distance D' is defined as the wired-network latency versus the latency of the wireless network, that is $$D' = \frac{D\tau_{c3}}{\tau_{c1}}$$

where $\tau_{c3}$ is the latency of the fixed network per unit length, while $\tau_{c1}$ is the latency of the wireless network.

As stated earlier, it is assumed that the links in the fixed network have a higher bandwidth than the wireless ones, but the longer the distance of the link, the larger the latency will be. This is due to delays (through switches, routers, and nodes) encountered in the link. Therefore, the significance of the relative assignment distance D' is that the distance of the wired network link is adjusted by the fraction of the wired and the wireless latency. For example, D'=1 means that the distance of the assignment is so long that the latency of the wired link (D'$\tau_{c3}$) is the same as that of the wireless one ($\tau_{c1}$).

Figure 13:
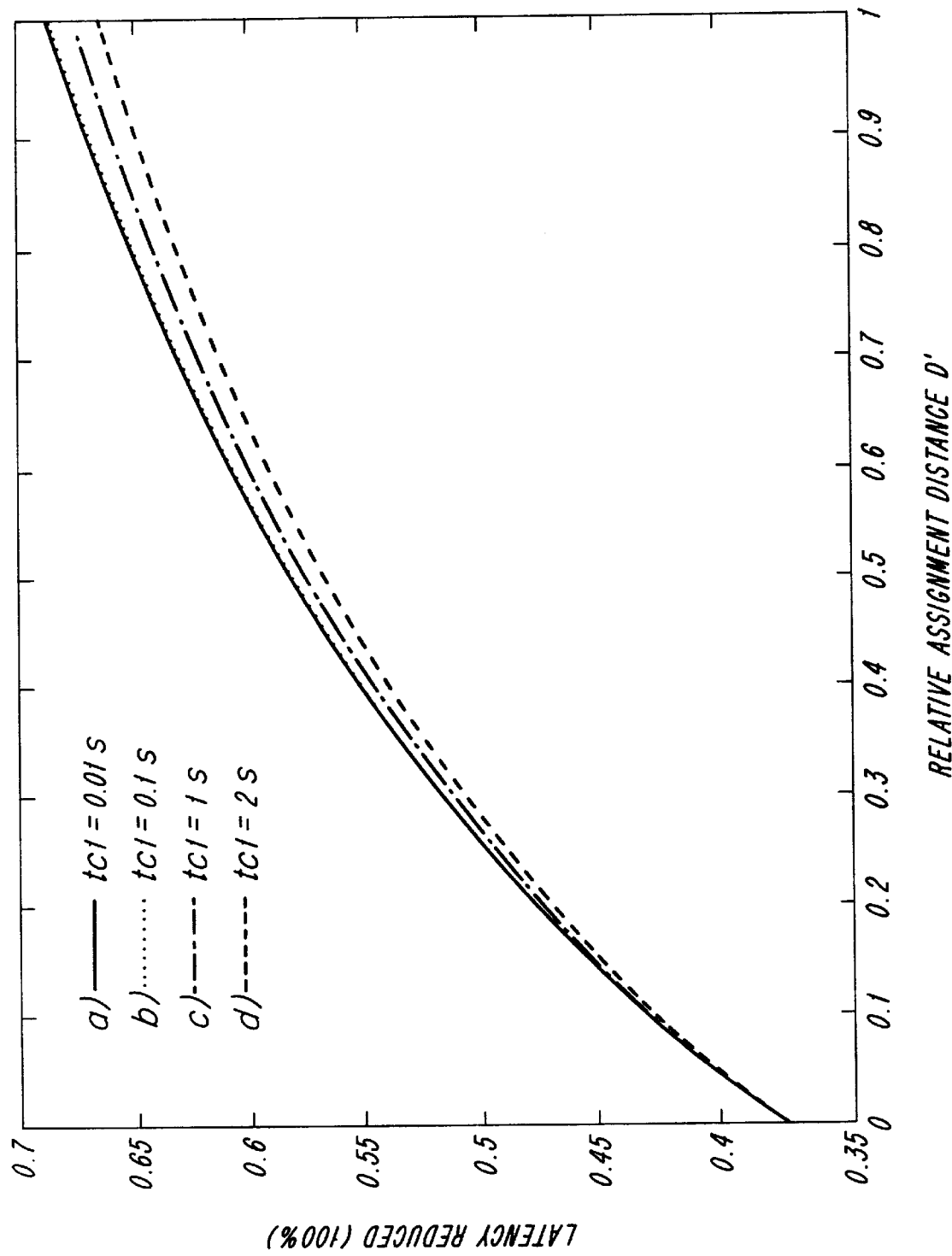
FIG. 13 illustrates Percentage of Latency Reduction vs. Relative Assignment Distance D.

In FIG. 13, it can be seen that, with the PTP assignment scheme, the percentage of reduced latency increases as the relative assignment distance increases. The delay of read and write operations can be reduced by more than 65% when the relative assignment distance D' is larger than 0.9. Therefore, the PTP scheme is more suitable for long distance assignments, such as travelling from New York to Europe.

With "Radius-d" Assignment

Figure 14A:
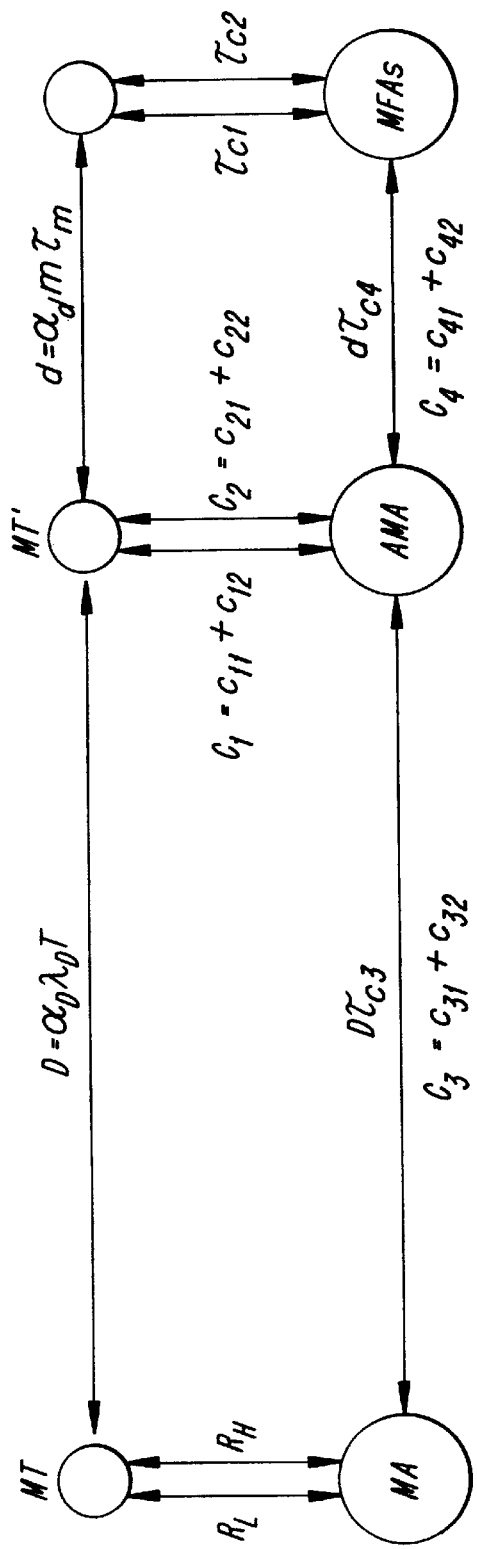
FIGS. 14A and 14B illustrate the Radius-d Assignment Scheme.

The MF-agent model with Radius-d assignment method is shown in FIG. 14A.

Figure 14B:
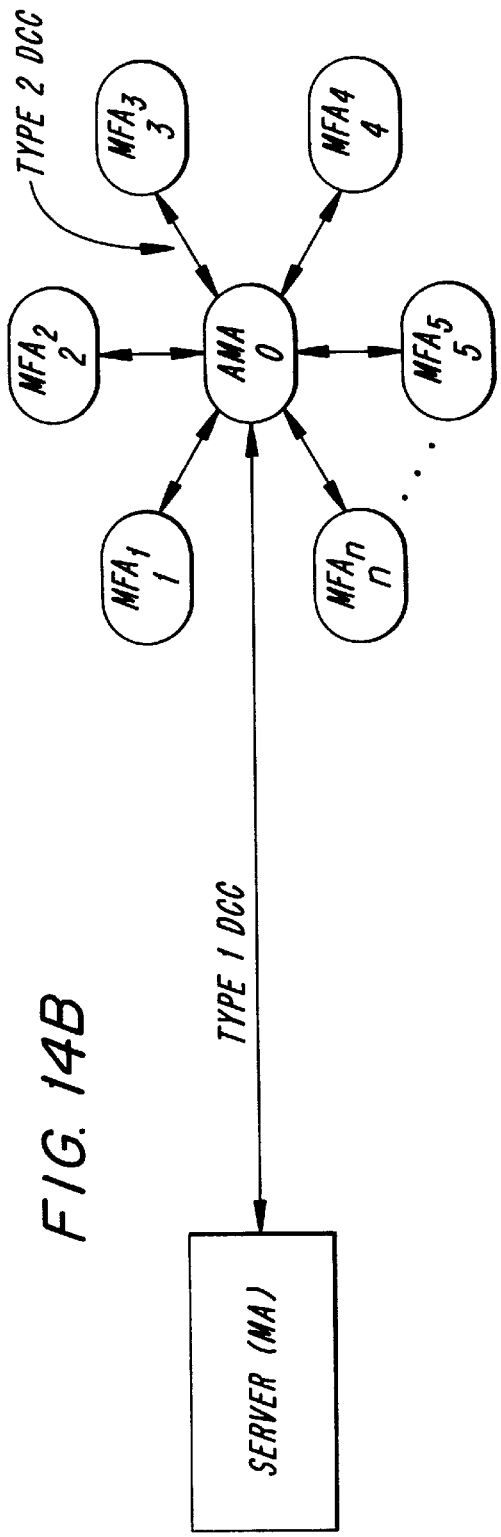

FIG. 14B shows an example of the structure of a radius d=1 scheme in a cellular system. As previously stated, the number of new cells a user has passed during a time interval (O,t)=T is assumed to have a Poisson distribution and the duration of a stay in a cell is exponentially distributed. Let $\lambda$ be the average movement rate during T. The probability of passing at least $\lambda T$ cells during the period T is $$P[N(T) \geq \lambda T] = \sum_{k=\lambda T}^{\infty} \left( \frac{(\lambda T)^k e^{-\lambda T}}{k!} \right) T \geq 0, (0 \leq \lambda \leq 1)$$

So, the latency of the wired network for a mobile user with the average movement or mobility rate $\lambda$ is $$L_{wired} = D \cdot P[N(T) \geq \lambda T] \tau_{c_3} = \alpha_D \lambda T P[N(T) \geq \lambda T] \tau_{c_3}$$

Therefore, the delay for a read and a write operation in a system with an MF-agent is $$L_{MF} = 2.6\tau_c + 0.09\alpha_D \lambda T P[N(T) \geq \lambda T] \tau_{c_1} \tau_{c_3}$$

and the delay without an MF-agent is $$L_{w/out} = 4(\tau_{c_1} + \alpha_D \lambda T P[N(T) \geq \lambda T] \tau_{c_3})$$

Thus, the percentage of latency reduction by using the MF-agent is $$G = \frac{L_{w/out} - L_{MF}}{L_{w/out}}$$

$$= \frac{1.4\tau_{c_1} + (4 - 0.09\tau_{c_1}) \cdot \left( \alpha_D \lambda T \tau_{c_3} \sum_{k=\lambda T}^{\infty} \left( \frac{(\lambda T)^k e^{-\lambda T}}{k!} \right) \right)}{4 \left( \tau_{c_1} + \alpha_D \lambda T \tau_{c_3} \sum_{k=\lambda T}^{\infty} \left( \frac{(\lambda T)^k e^{-\lambda T}}{k!} \right) \right)}$$

where $\frac{1}{2\pi} \leq \alpha_D \leq 1$.

where $1/2\pi \leq \alpha_D \leq 1$.

Figure 15:
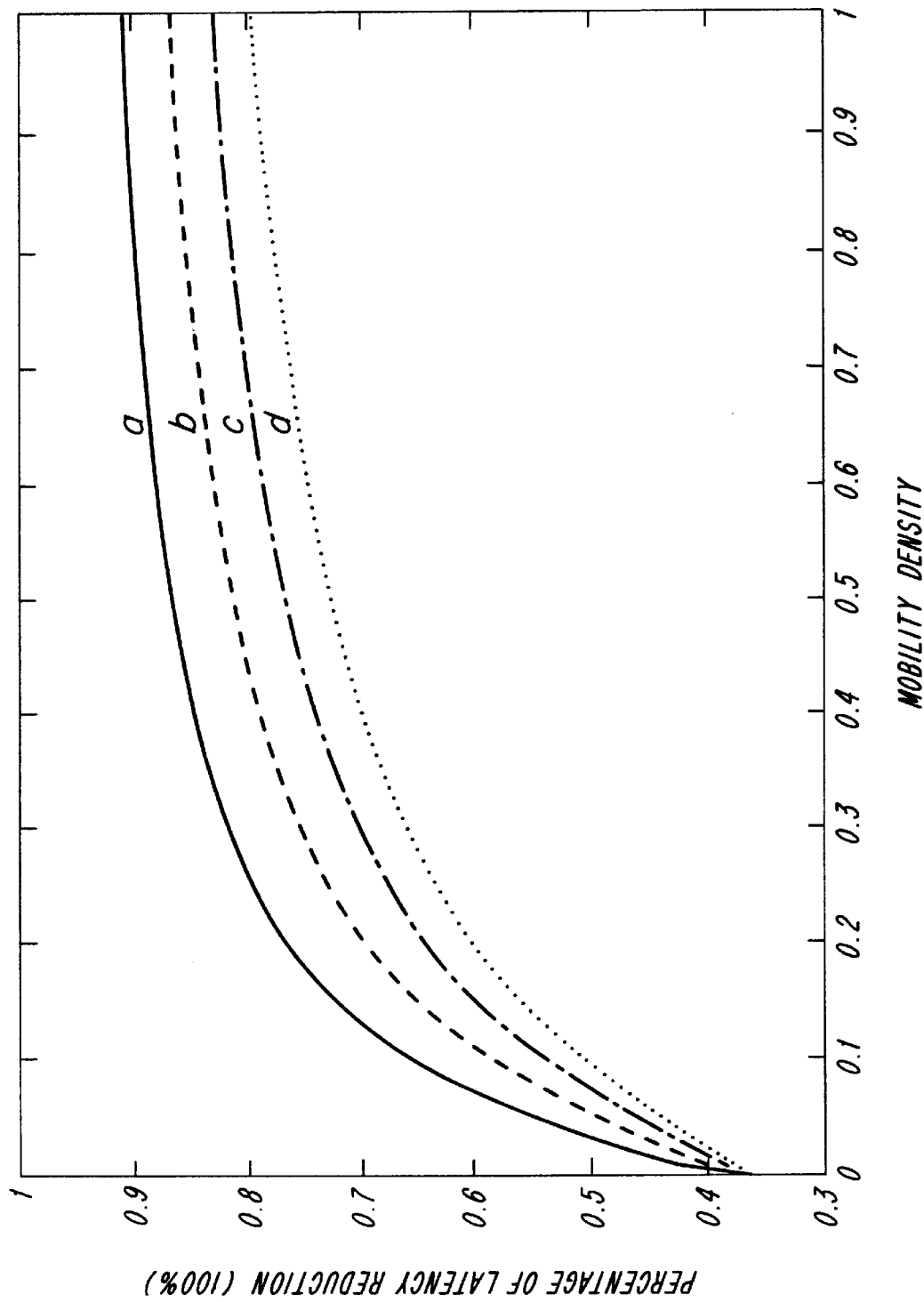
FIG. 15 depicts the Percentage of Latency reduction vs the Average Mobility Rate for the Radius-d Assignment Scheme.

In FIG. 15 the percentage of latency reduction G versus the average movement rate $\lambda$ is plotted. It is assumed that T=100 minutes $\alpha_d=0.5$, $\alpha_d=1$, and $T_{c3}=1$ second.

From FIG. 15 it can be seen that the Radius-d method cuts the latency of read and write operations by more than 60% for users with an average mobility rate larger than 0.2. The higher the mobility of the users, the more the percentage of latency is reduced. This shows that this scheme is very efficient in reducing mobility related latency.

With MT/MC/d Assignment

With the MT/MC/d assignment method, the MF-agents are only assigned to the fixed hosts or router that are located on the predicted MC or MT pattern within circle d. This can greatly reduce the total number of MF-agents assigned and avoid many unnecessary assignments, and thus, reduce the background overhead costs for high mobility density users.

Figure 16:
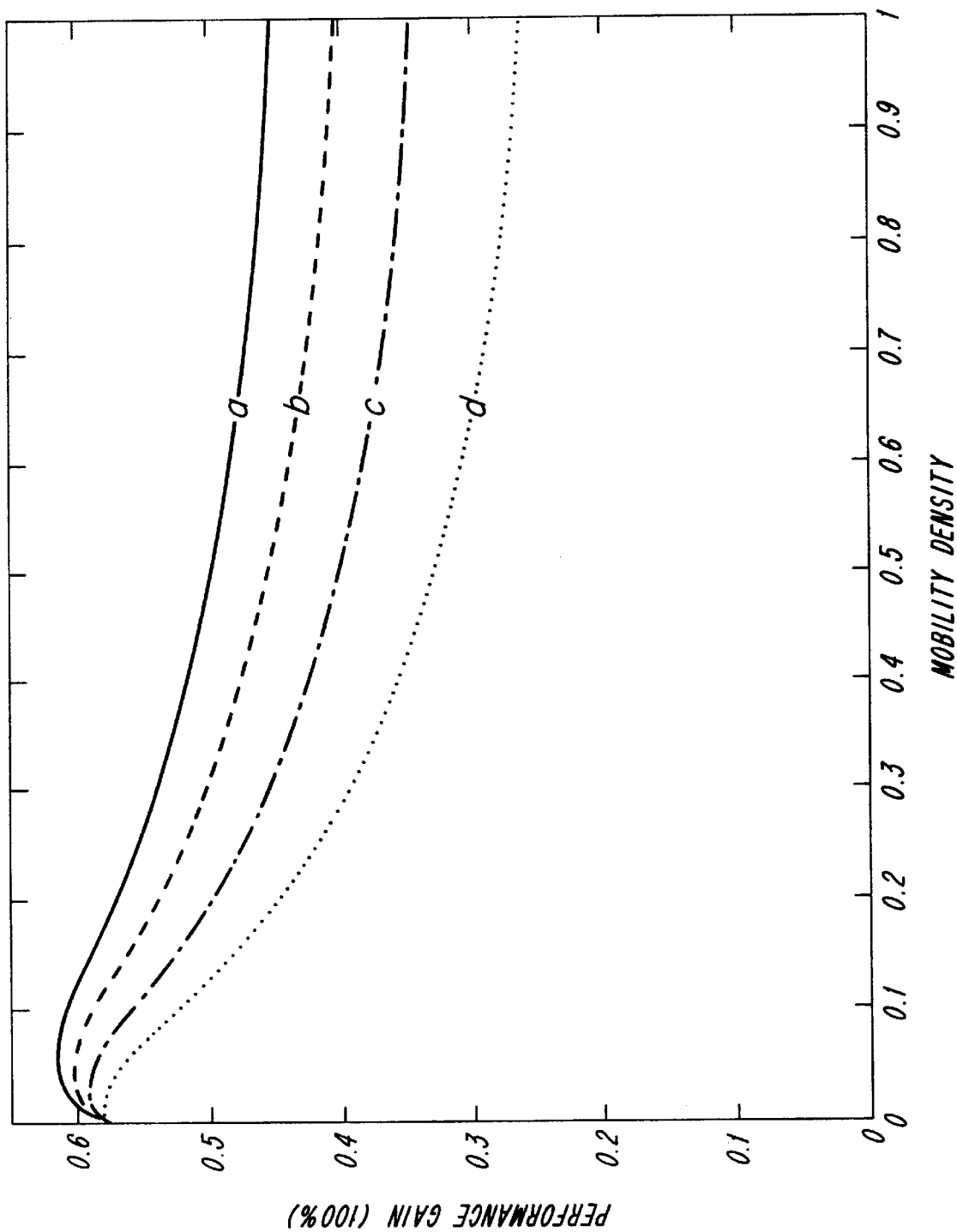
FIG. 16 illustrates the Performance gain vs. Mobility density for the MT/MC/d assignment method.

FIG. 16 shows the total performance gain with the MT/MC/d assignment algorithm versus mobility density. It is assumed that the number of MF-agents assigned each time is $2 \cdot [\alpha_d m \tau_m]$, that is, the same as the diameter of the assignment circle.

As shown in FIG. 16, curve a, the total performance gain is improved by more 45% for any mobility density users, given the prediction accuracy rate of the predictive mobility management function is larger than 0.9. For an average prediction accuracy rate 0.6 or more, the total performance gain can also be improved by more than 25% for the high mobility density users, as shown by curve d. For example, suppose a user has an average mobility density $\lambda=1$ during time period T, this means that the user is changing cells for each time unit and does not stop during time period T. By using the MF-agent scheme with MC/MT/d assignment algorithm, the user can still have more than 25% total performance gain compared with the performance without the MF-agents.

It is worth noting that the total performance gain here is defined as the percentage of reduced latency minus the percentage of increased background costs. This means that even when the total performance gain is equal to zero or negative, there may still be some latency reduction. For example, when the total performance gain equals zero, this means the percentage of reduced latency is equal to the percentage of increased background costs (thus they are linearly trading off increased background costs for reduced latency). From the user's point of view, the most important performance measure is the percentage of latency reduced.

Figure 17:
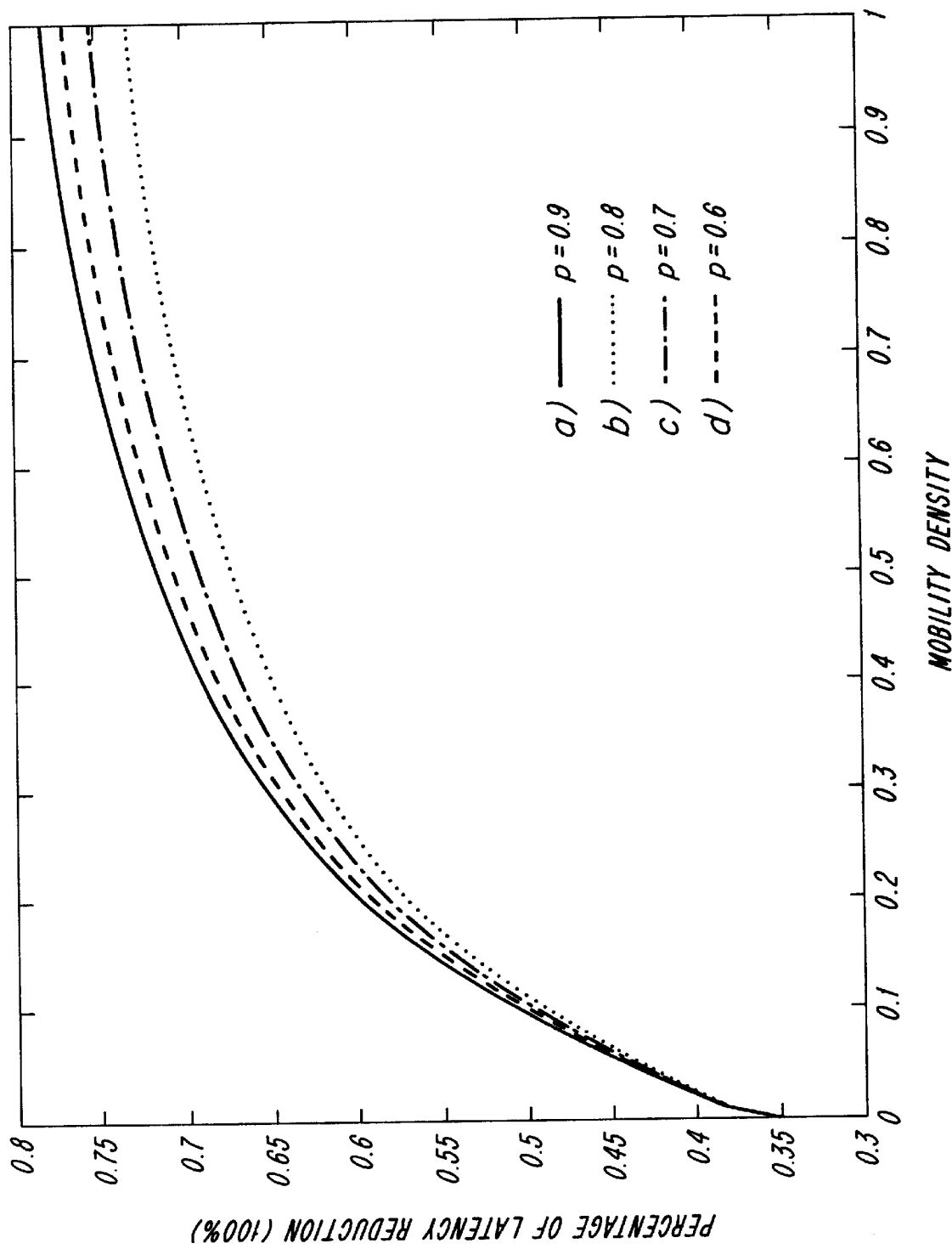
FIG. 17 illustrates the percentage of Latency reduction vs. Mobility Density for the MT/Mc/d Assignment method.

FIG. 17 depicts the percentage of latency reduction by deploying the MF-agent scheme with the MC/MT/d assignment algorithm versus the mobility density. Curves a, b, c and d correspond to the prediction accuracy rates of 0.9, 0.8, 0.7 and 0.6 respectively. It is noted that the percentage of latency reduced is not so sensitive to the average prediction accuracy rate. Even when 40% of the time the prediction is wrong, the latency can still be reduced by more than 65% in the mobility density interval [0.4, 1].

The performance of the MF-agent scheme with different assignment methods, namely Point-to-Point, Radius-d and MC/MT/d have been analyzed and evaluated above. Detailed analyses of these schemes in terms of latency reduction have been presented. The evaluation results show that the MF-agent scheme with the predictive MC/MT/d assignment method can improve overall performance by more than 25% for any mobility density of users and can reduce the access latency for normal mobility density users in the range (0.2, 1) by more than 55%.

Mobile Floating Agent Implementation Issues

Figure 18:
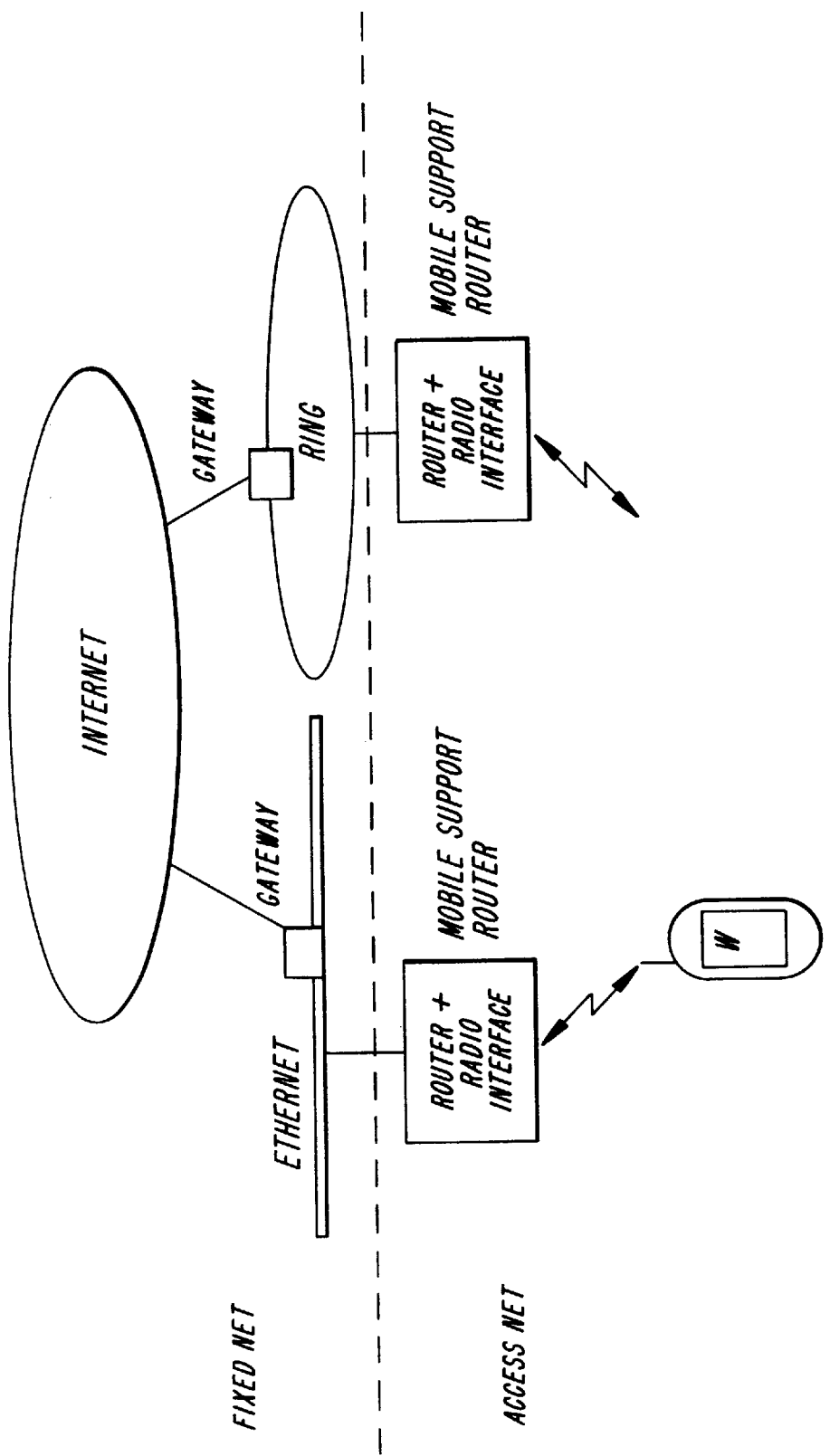
FIG. 18 shows the general Architecture of a Wireless LAN.

FIG. 18 shows a general wireless LAN architecture. The general architecture of a wireless LAN connected by Internet may consist of two basic parts: 1) fixed LANs (e.g. ethernet, ring, etc.); and 2) wireless interfaces, such as Mobile Support Routers with radio and IR.

Figure 19:
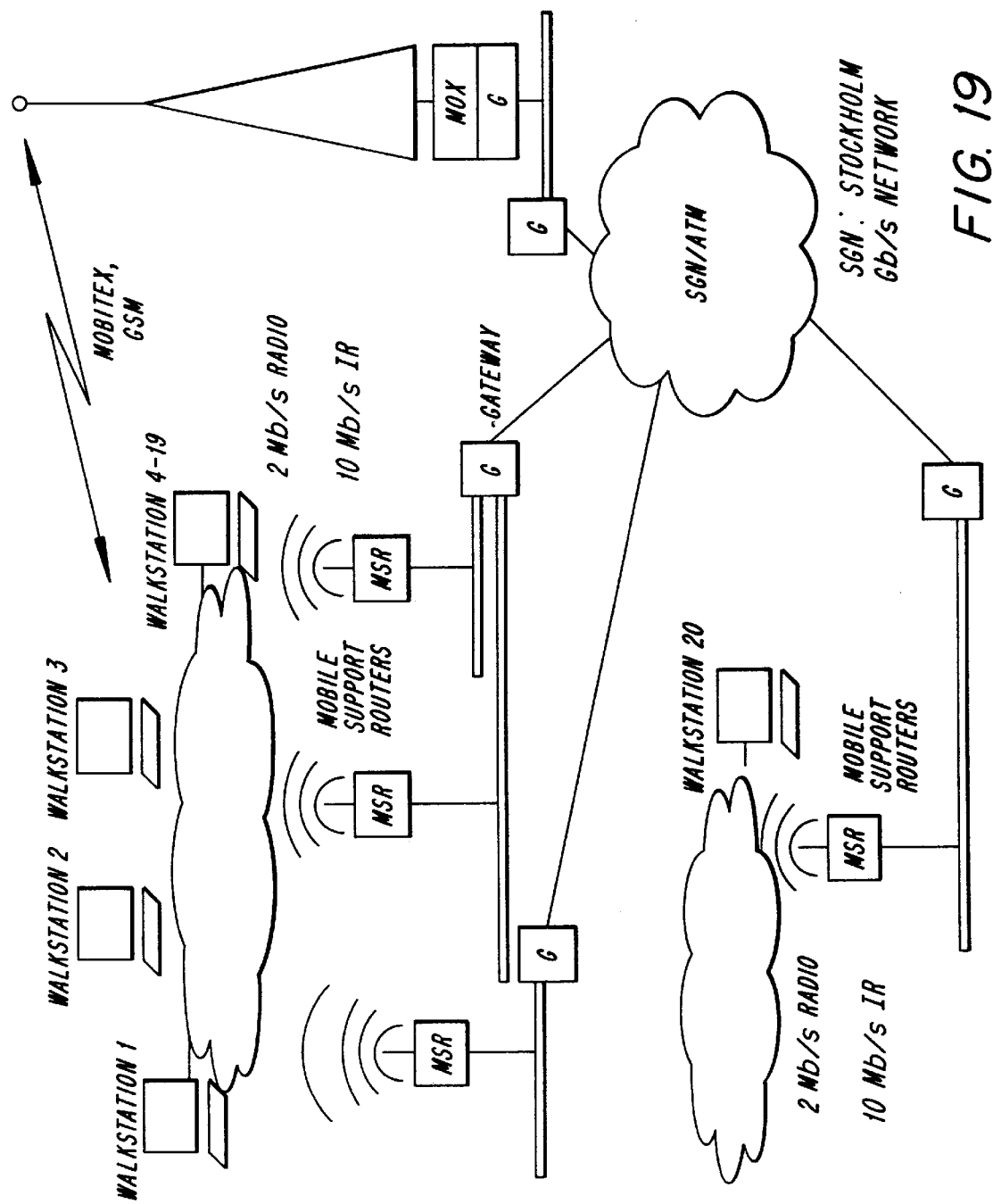
FIG. 19 is an example of a useful testbed for use with the present invention.

FIG. 19 is an example of a good testbed for the present invention. The testbed architecture shown in FIG. 19 includes 5 LANS, interconnected by a Gigabit Network. The mobile-IP, as outlined in IETF, "IP Mobility Support," Networking Working Group Internet Draft 11, April 1995, hereby incorporated by reference, is used as the basis for the network layer protocol. The network consists of Walkstations, or mobile terminals, and mobile support routers (MSRs) which are attached to the wireless and fixed LANs. The MSRs comprise the hardware interfaces with the addition of the mobile IP software. All Walkstations have a permanent address on a virtual network. The virtual network appears to the outside world as two networks. Each virtual network in reality is composed of many physical cells. The MSRs execute a distributed algorithm to "heal" the partitions in this virtual network to give the effect of providing a single network.

The Protocol Architecture with MF-Agents

Figure 20:
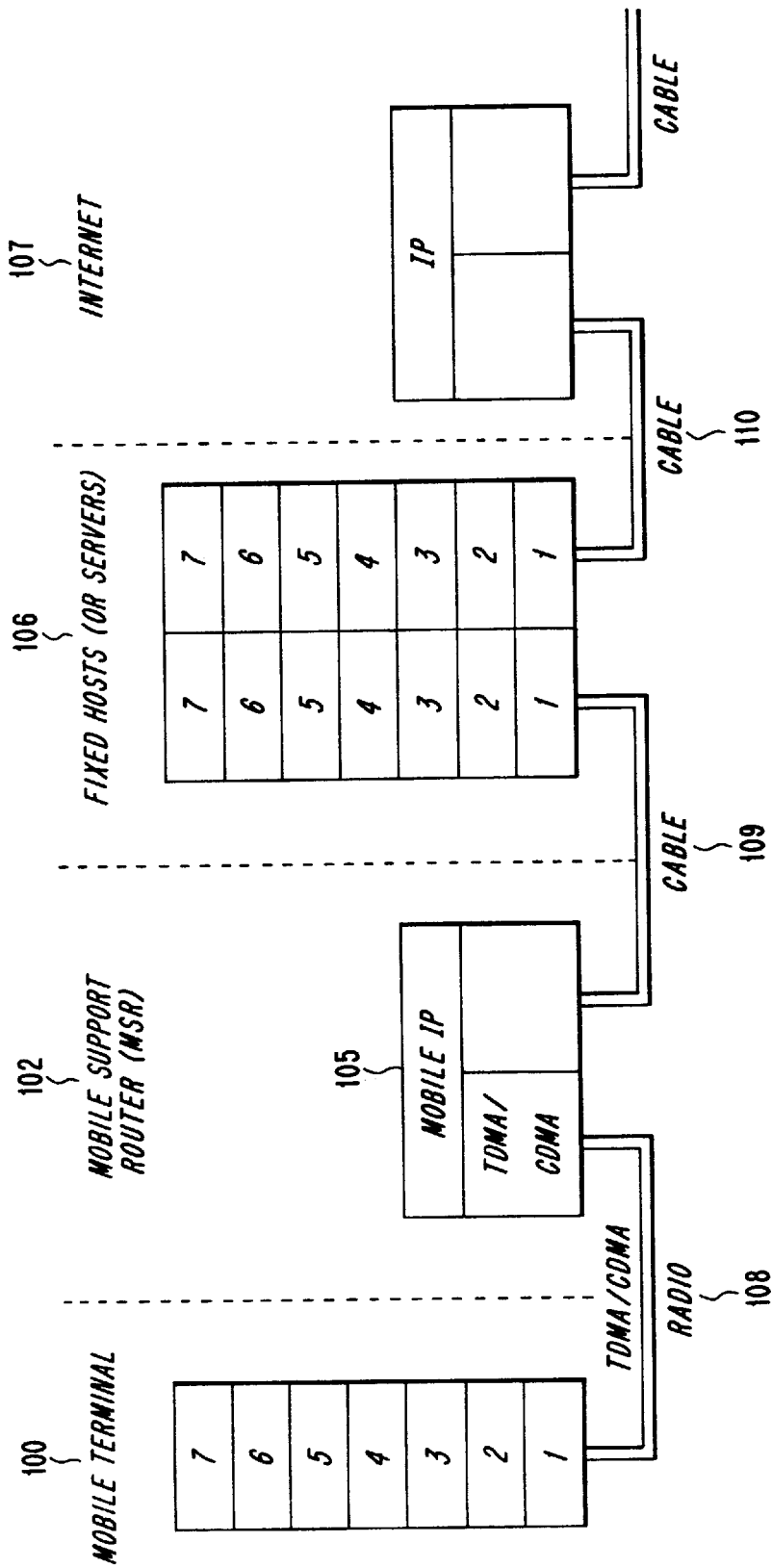
FIG. 20 depicts the protocol architecture of a wireless LAN.

The Protocol Architecture of a wireless LAN in the Open System Interconnection (OSI) reference model is shown in FIG. 20. The interactive protocol layer (layer 3) routes packets between different LANS. Traditionally, the access net, which in this case is the mobile support router 102, consists of only layers 1 to 3 (network layer). The Mobile IP 105 (at layer 3) is responsible for mobile address migration and routing packets to or from mobile terminals 100.

The conventional protocol architecture, as shown in FIG. 20, provides a basic possibility of mobility support for mobile terminals at the network layer. Unfortunately, none of the problems associated with data and service mobility as discussed above, can be solved by such a system. Furthermore, due to the bandwidth difference between the wireless media layer 108 (from the MSR to mobile terminal) and the wired media layer 109 (from the MSR to the fixed server), several performance problems may exist when a mobile host accesses a fixed server's resources.

First the mobile terminals 100 can face a serial bottleneck. This occurs when mobile terminals 100 access fixed servers 106 through the serial path of the wireless link 108 and wired link 109. This means that the bandwidth of the access path is limited by the serial bottleneck, that is, the wireless link part 108. No matter how fast the transmission speed of the fixed network is, the speed of the round-trip path is blocked by the bottleneck. This kind of bottleneck transmission may degrade the speed of the fixed network.

Another problem that can be encountered is Transmission Control Protocol (TCP) timer back-off. The TCP provides support for stream oriented end-to-end communication with reliable delivery. This requires retransmission associated timers to guarantee reliable delivery by retransmission should a time-out occur. The serial bottleneck problem of a wireless link, associated with temporary disconnection, temporary failure, or handover, for example, may cause a TCP timer back-off. For example, if a mobile terminal has an open TCP connection to a fixed host and at the same time the mobile terminal becomes temporarily disconnected from the network, the mobile terminal is unable to retrieve data from the TCP window. As the data is sent to the TCP window on the fixed host, the TCP window fills. Once the window fills, it becomes unable to store any more data. This will cause the TCP to back off and retransmit less and less frequently. After reconnecting, the mobile terminal will have to wait for the next retransmission from the fixed host before it can continue receiving its data.

Most of the above-described problems, as well as the problems discussed in the previous sections of this disclosure, can be solved by the MF-agent manager with its MF-agent. The MF-agent manager and its MF-agent can be implemented at Mobile Support Routers (MSRs), at fixed hosts or at both places. A mobile terminal could be a cellular phone, computer, host, and the like.

Figure 21:
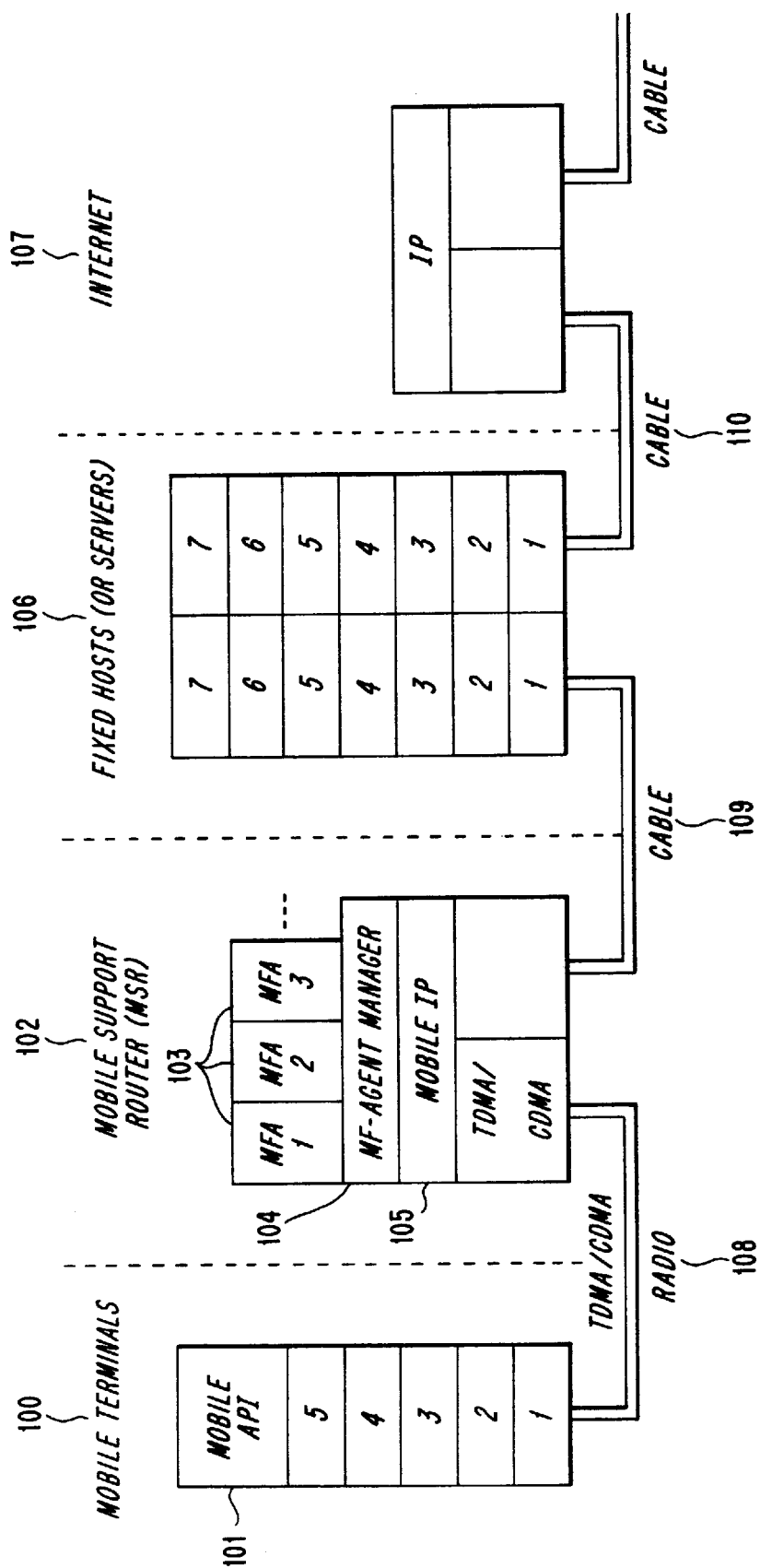
FIG. 21 shows an example of the Mobile Floating Agent on the MSR Protocol Architecture.
Figure 22:
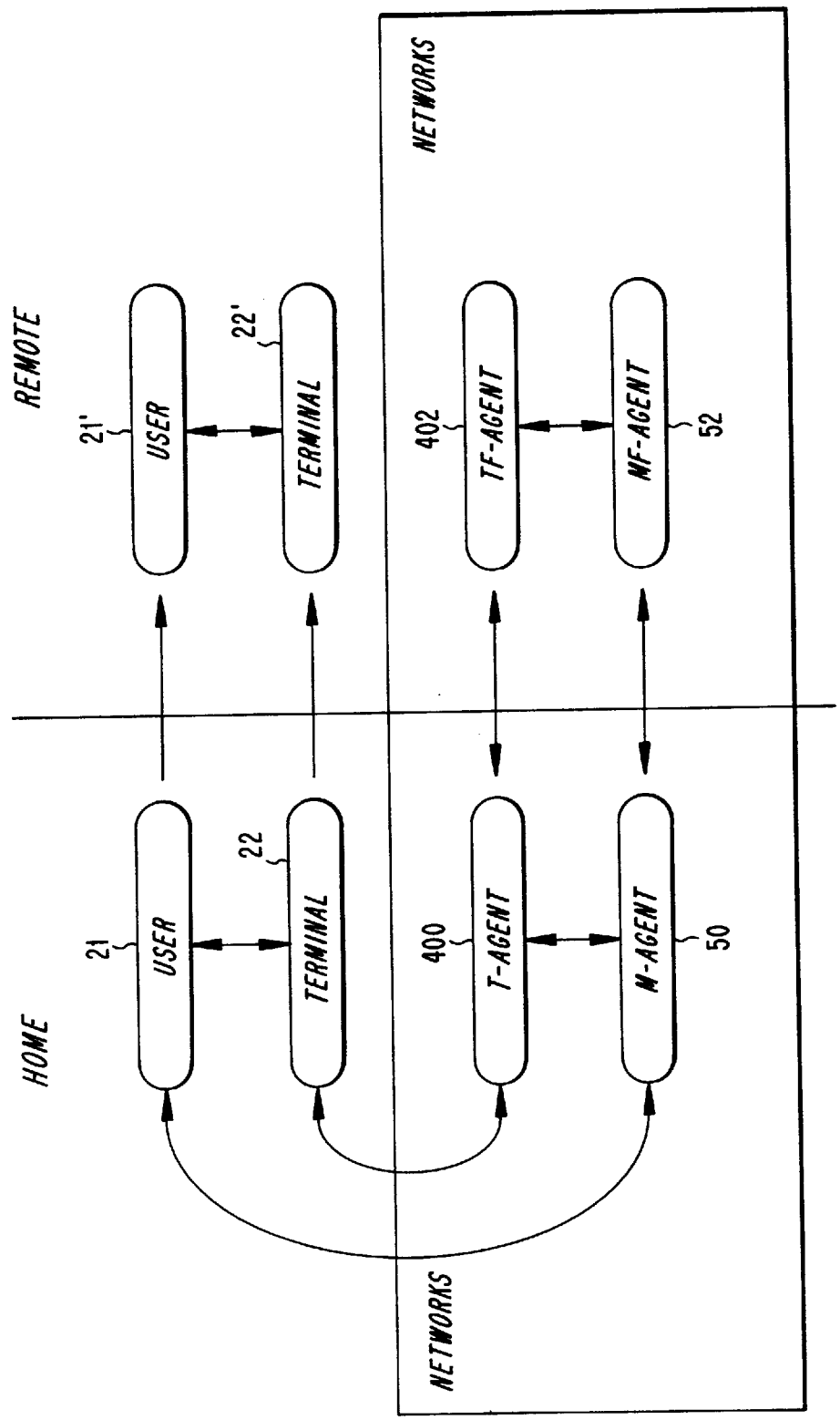
FIG. 22 illustrates the relationship between M-agents and T-agents.

FIG. 21 shows one of the possible implementations of the MF-agent on the MSR protocol architecture of a wireless LAN. The MF-agent manager 104 and its MF-agents 103 are built at the MSRs 102 on top of the Mobile IP layer 105. They have the following functions:

1. For each mobile terminal 100 registered at the MSR serviced area, the MF-agent manager 104 creates a Terminal Agent (T-agent) which represents the mobile terminal 100 in the network (the T-agent can also be created or assigned in a remote way, e.g., by a remote personal agent or terminal agent; in this case, it is a called floating terminal (FT)-agent). After the T-agent's associated mobile terminal 100 logs in at the service area of the MSR 102, the FT-agent 303 associated with the mobile terminal becomes an acting terminal agent. The relationship between a T-agent, M-agent, TF-agent and MF-agent is illustrated in FIG. 22. A T-agent performs the same functions as the M-agent, but the T-agent represents a specific mobile terminal, whereas and M-agent represents a specific mobile user. The same is true for an MF-agent and a TF-agent. (See above section entitled "Mobile Floating Agent Concepts" for a description of Floating Agent functions and protocol).

2. The T-agent "snoops" or monitors the traffic between its mobile terminal 100 and the fixed net. Whenever the wireless link is disconnected, that is, whenever its mobile terminal 100 is not responding, the T-agent takes care of the communication to or from the fixed net on behalf of its mobile terminal.

3. The T-agent manages a secondary cache and mobility information of its mobile terminal 100.

4. If a mobile terminal 100 is going to move to an area or cell serviced by another MSR 102 (this can be predicted by the PMM in the mobile terminal 100 as discussed above), the T-agent will pre-arrange the movement by informing the MF-agent manager 104 in the other MSR 102 to create an MF-agent for its mobile terminal and to manage the handover process.

5. Upon logging in by the mobile terminal 100 at the new area, the MF-agent is active as a T-agent and sends a message back to de-activate the previous T-agent.

Figure 23:
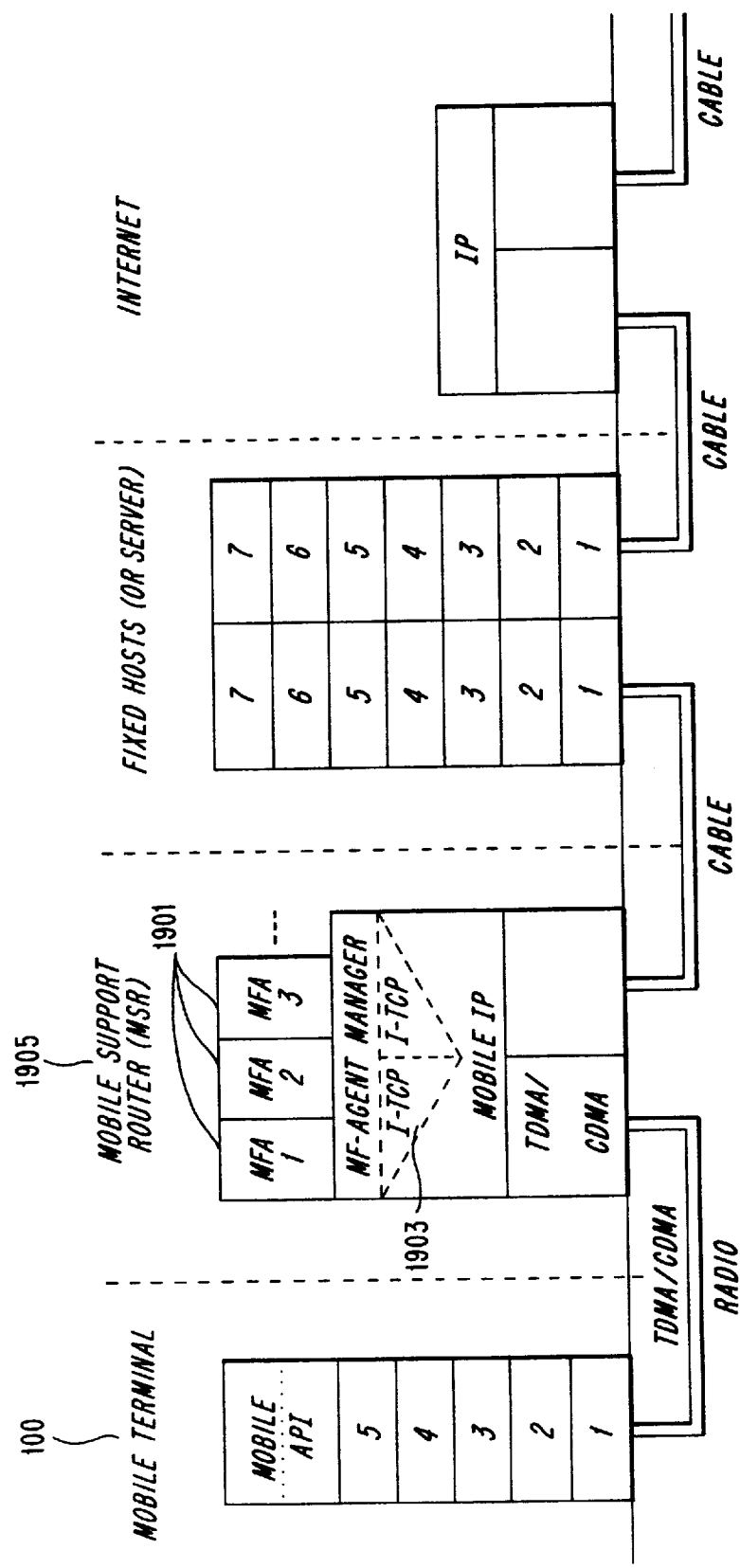
FIG. 23 is an example of Mobile Floating (MF)-Agent implementation.

FIG. 23 shows an exemplary implementing of the MF-agent 1901 on top of the I-TCP 1903 at an MSR 1905, in accordance with one aspect of the invention.

The Mobile Floating Agent in Cellular Systems

Figure 24:
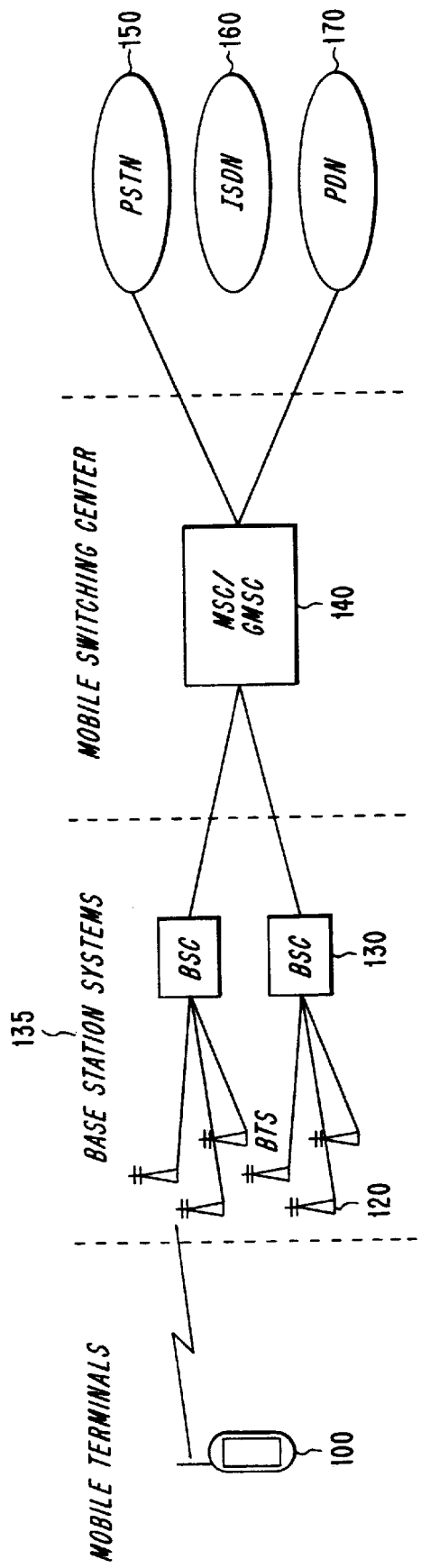
FIG. 24 is an example of a cellular architecture.

Referring to FIG. 24, a conventional cellular architecture generally comprising a Mobile Switching Center (MSC) 140, base station systems (BSS) 135 and mobile terminals 100. The BSS 135 can be subdivided into different subsystems, such as, the Base Station Controller (BSC) 130 and Base Transceiver Station (BTS) 120. The service area is divided into cells. Each cell is covered (i.e., served) by a BTS 120 operating on a set of radio channels which are different from the ones used in neighboring cells in order to avoid interference. A group of BTSs 120 is controlled by a BSC 130 which also controls such functions as handover and power control. A number of BSCs 130 are served by an MSC 140. The Gateway MSC (GMSC) 140 controls calls to and from the Public Switched Telephone Network (PSTN) 150, Integrated Services Digital Network ISDN 160, Public Data Network (PDN) 170, and the like.

The Protocol Architecture with MF-Agents

Figure 25A:
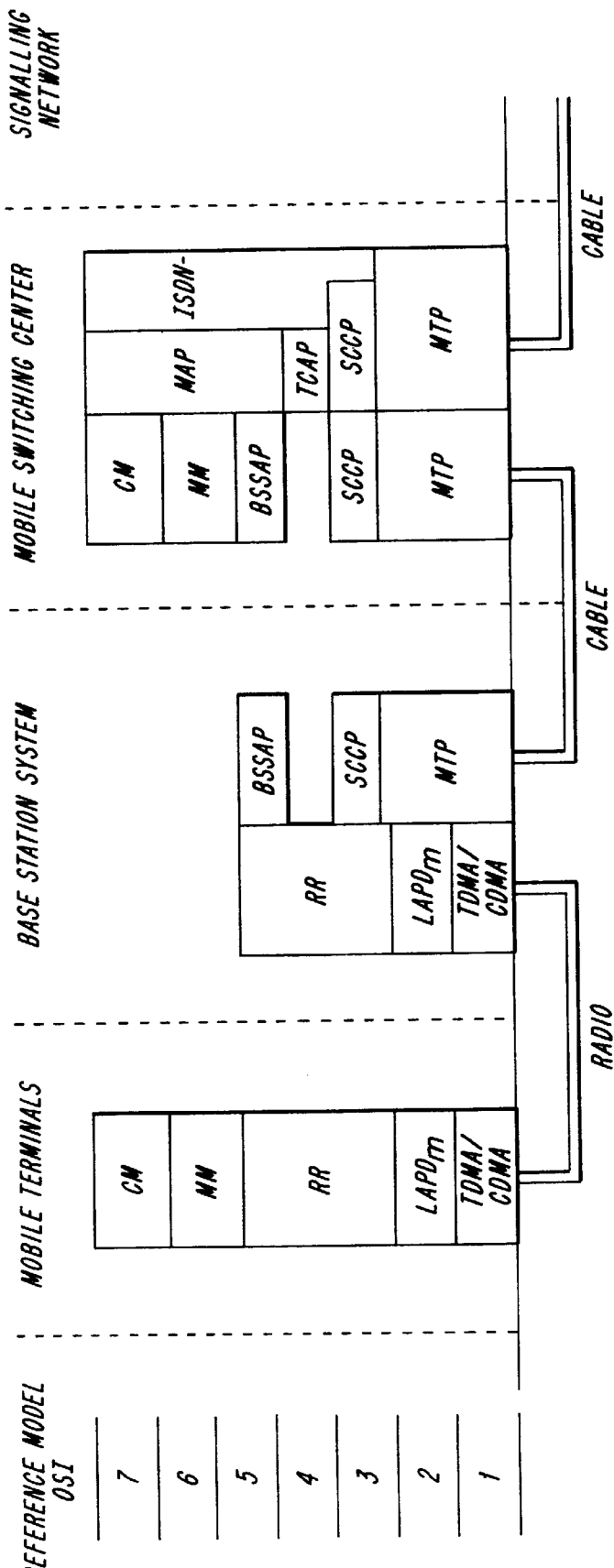
FIGS. 25A and 25B show a cellular communication system implementation and an example of MF-Agent (MFA) implementation on a cellular communication system.
Figure 25B:
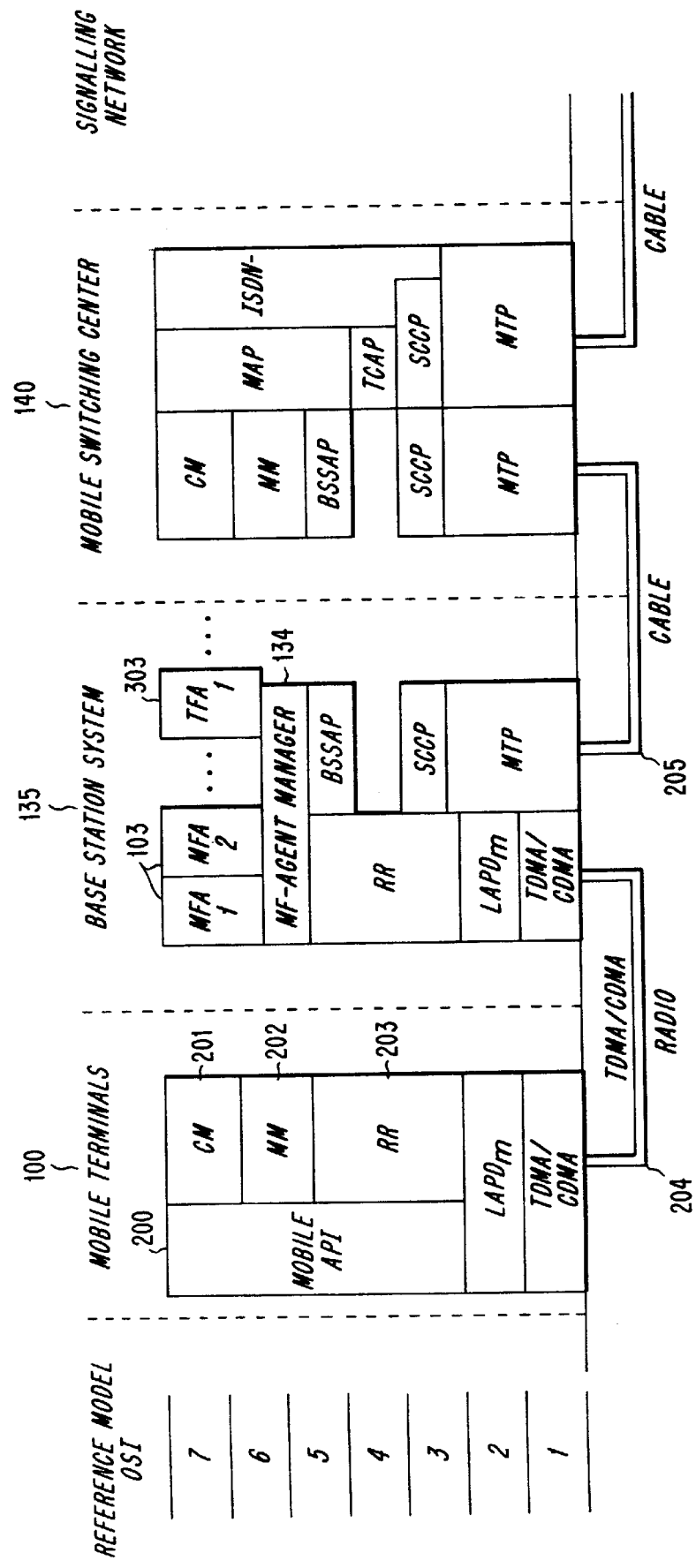

FIG. 25A shows the conventional GSM protocol architecture for signalling. The OSI reference model is also shown in FIGS. 25A and 25B as a reference between the Wireless LAN architecture above. The major difference between the OSI model and the cellular network architecture is that the latter uses outband signalling via a separate network.

In accordance with the invention, one of the possible ways to implement the MF-agent 133 and MF-agent manager 134 is at the Base Station System 135, as shown in FIG. 25B. The MF-agent 133 can also be used to support Distributed Mobility Management Functions and distributed HLR, visitor location register (VLR) and EIR (Equipment Identity Register) functions. For support of mobile data service, the Mobile-API layer 200 should be added at the mobile terminal 100.

The MF-agents can also be implemented at a gateway router between an MSC 140 and the Internet. In this case, they perform functions similar to those described in the section on Protocol Architecture.

Conclusion

A mobile virtual distributed system architecture with the notion of a mobile floating agent to support global mobility and computing has been disclosed.

The introduction of service and resource mobility demands new requirements on personal/terminal mobility management support. Traditionally, personal/terminal mobility management included functions to passively keep track of the location of the users/terminals and to maintain connections to the terminals belonging to the system. An aggressive mobility management scheme, called predictive mobility management has been developed. A Predictive Mobility Management (PMM), as described previously, is used to predict the future location of a mobile user according to the user's movement history patterns.

The combination of the mobile floating agent concepts with the predictive mobility management allow for service and resource pre-arrangement. The data or services are pre-connected and assigned at the new location before the user moves into the new location. As a result, the user can get his/her service or data accessed with virtually the same efficiency as at the previous location.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A method of distributing network services and resources to a mobile user in a mobile communication system, the method comprising the steps of:

providing the mobile user with a mobility (M)-agent executing on a home fixed host or router;

determining that the mobile user is or will be travelling to a destination that is outside a service area of the home fixed host or router;

sending a pre-assignment request from the M-agent to at least one mobile floating (MF)-agent manager executing on a corresponding one of at least one remote fixed host or router located at the destination;

establishing a mobile floating (MF)-agent for use by the mobile user at each of the at least one remote fixed hosts or routers; and using the M-agent to send data or service information from the service area of the home fixed host or router to the MF-agent at each of the remote fixed hosts or routers.

2. The method according to claim 1, wherein the step of establishing the MF-agent comprises the steps of, at each of the at least one remote fixed hosts or routers, if no preexisting MF-agent exists at the remote fixed host or router, then creating the MF-agent for use by the mobile user at the remote fixed host or router, otherwise assigning the preexisting MF-agent for use by the mobile user at the remote fixed host or router.

3. The method according to claim 2, further comprising the steps of:

registering the alternatively created or assigned MF-agent with a foreign agent (FA) located at the remote fixed host or router; and sending an establishment reply from the MF-agent manager to the M-agent, wherein the establishment reply includes information for enabling the M-agent to establish a data consistency link with the MF-agent.

4. The method according to claim 3, wherein each MF-agent includes a set of processes, executing on the corresponding remote fixed host or router, for communicating and connecting with local resources and for managing a variable replicated secondary data cache on behalf of the M-agent.

5. The method according to claim 3, wherein the M-agent includes a set of processes, executing on the home host or router, for communicating with each MF-agent.

6. The method according to claim 3, further comprising the step of using one of the MF-agents to perform acting mobility (AM)-agent functions in response to the mobile user having logged in at the remote fixed host or router that corresponds to the one of the MF-agents.

7. The method according to claim 6, wherein the step of using the one of the MF-agents to perform AM-agent functions includes the steps of:

determining that the mobile user is or will be travelling to a second destination that is outside a remote service area of the remote fixed host or router that corresponds to the one of the MF-agents;

sending the pre-assignment request from the one of the MF-agents to at least one other MF-agent manager executing on a corresponding other one of at least one remote fixed host or router located at the second destination;

establishing a second MF-agent for use by the mobile user at each of the at least one remote fixed hosts or routers located at the second destination; and using the one of the MF-agents to send data or service information from the remote service area of the remote fixed host or router to the other MF-agent at each of the remote fixed hosts or routers located at the second destination.

8. The method according to claim 6, further comprising the steps of:

for each MF-agent, starting a corresponding timer when the MF-agent is alternatively created or assigned for use by the mobile user; and for each MF-agent, resetting and stopping the corresponding timer in response to the mobile user having logged in at the remote fixed host or router that corresponds to the MF-agent, wherein each MF-agent is deactivated whenever the corresponding timer reaches a predetermined value.

9. The method according to claim 6, further comprising the steps of:

for each MF-agent, when the MF-agent is alternatively created or assigned, initializing a corresponding parameter that indicates how recently the MF-agent has been used;

for each MF-agent, updating the corresponding parameter whenever the MF-agent is used by the mobile user; and when resources at one of the remote fixed hosts or routers need to be reclaimed, then performing the steps of:

identifying all corresponding MF-agents for the one of the remote fixed hosts or routers;

selecting one of the identified MF-agents that has a corresponding parameter that indicates that the selected one of the identified MF-agents is the least recently used of all of the identified MF-agents; and reclaiming resources from the selected one of the identified MF-agents.

10. The method according to claim 3, further comprising the steps of:

sending a registration request from the mobile user to the foreign agent; and in response to receipt of the registration request, if there is an MF-agent registered for the mobile user, then sending, from the FA to the mobile user, a confirmation and a link for accessing the MF-agent.

11. The method according to claim 1, wherein the step of sending the pre-assignment request from the M-agent to at least one mobile floating (MF)-agent manager executing on the corresponding one of at least one remote fixed host or router located at the destination comprises the steps of:

identifying the corresponding remote fixed hosts or routers located at the destination; and sending the pre-assignment request from the M-agent to each of the MF-agent managers executing on one of the identified corresponding remote fixed hosts or routers, wherein identifying the corresponding remote fixed hosts or routers located at the destination comprises the steps of:

(1) determining a mobility density m, wherein m is a number of cells that have been passed by the mobile user during time $\tau_m$;

(2) defining a circularly shaped geographic location centered at a current location of the mobile user and having a radius $d=int(h*m*\tau_m)$, wherein d is a service distance and h is a hierarchic factor defined by the number of cells service by one MF-Agent Manager; and (3) identifying the remote fixed hosts or routers that are located within the circularly shaped geographic location.

12. The method according to claim 1, wherein the step of sending the pre-assignment request from the M-agent to at least one mobile floating (MF)-agent manager executing on the corresponding one of at least one remote fixed host or router located at the destination comprises the steps of:

identifying the corresponding remote fixed hosts or routers located at the destination; and sending the pre-assignment request from the M-agent to each of the MF-agent managers executing on one of the identified corresponding remote fixed hosts or routers, wherein identifying the corresponding remote fixed hosts or routers located at the destination comprises the steps of:

sending a message from the mobile user to the M-agent, wherein the message designates the destination;

using the M-agent to identify the MF-agent manager that is executing on a remote fixed host or router that is located at the destination.

13. The method according to claim 12, wherein:

the message further includes a designated time that the mobile user will be at the destination; and the method further comprising the step of transferring data from the M-agent to a secondary cache of the MF-agent, wherein the data transfer is performed at a time that has a predetermined relationship with the designated time.

14. The method according to claim 1, wherein the step of sending the pre-assignment request from the M-agent to at least one mobile floating (MF)-agent manager executing on the corresponding one of at least one remote fixed host or router located at the destination comprises the steps of:

identifying the corresponding remote fixed hosts or routers located at the destination; and sending the pre-assignment request from the M-agent to each of the MF-agent managers executing on one of the identified corresponding remote fixed hosts or routers, wherein identifying the corresponding remote fixed hosts or routers located at the destination comprises the steps of:

(1) determining a mobility density m, wherein m is a number of cells that have been passed by the mobile user during time $\tau_m$;

(2) defining a circularly shaped geographic location centered at a current location of the mobile user and having a radius $d=int(h*m*\tau_m)$, wherein d is a service distance and h is a hierarchic factor defined by the number of cells serviced by one MF-agent manager;

(3) predicting a movement track (MT) or movement circle (MC) of the mobile user; and (4) identifying the remote fixed hosts or routers that are located on the predicted MT or MC within the circularly shaped geographic location.

15. A method for distributing network services and resources to a plurality of mobile users in a mobile communication system in order to ensure that at least one mobile floating (MF)-agent is supporting each mobile user, the method comprising the steps of:

for each one of the mobile users, (1) determining a mobility density m, wherein m is a number of cells that have been passed by the mobile user during time $\tau_m$;

(2) defining a circularly shaped geographic location centered at a current location of the one of the mobile users and having a radius $d=int(h*m*\tau_m)$, wherein d is a service distance and h is a hierarchic factor defined by the number of cells serviced by one MF-agent manager;

(3) identifying the remote fixed hosts or routers that are located within the circularly shaped geographic location; and (4) establishing a mobile floating (MF)-agent for use by the mobile user at each of the identified remote fixed hosts or routers.

16. A method for distributing network services and resources to a plurality of mobile users in a mobile communication system in order to ensure that at least one mobile floating (MF)-agent is supporting each mobile user, the method comprising the steps of:

for each one of the mobile users, (1) determining a mobility density m, wherein m is a number of cells that have been passed by the mobile user during time $\tau_m$;

(2) defining a circularly shaped geographic location centered at a current location of the one of the mobile users and having a radius $d \geq h*m*\tau_m$, wherein d is a service distance and h is a hierarchic factor defined by the number of cells serviced by one MF-agent manager;

(3) identifying the remote fixed hosts or routers that are located within the circularly shaped geographic location; and (4) establishing a mobile floating (MF)-agent for use by the mobile user at each of the identified remote fixed hosts or routers.

17. A method for distributing network services and resources to a plurality of mobile users in a mobile communication system in order to ensure that at least one mobile floating (MF)-agent is supporting each mobile user, the method comprising the steps of:

for each one of the mobile users, (1) determining a mobility density m, wherein m is a number of cells that have been passed by the mobile user during time $\tau_m$;

(2) defining a circularly shaped geographic location centered at a current location of the one of the mobile users and having a radius d=int(h*m*$\tau_m$), wherein d is a service distance and h is a hierarchic factor defined by the number of cells serviced by one MF-agent manager;

(3) predicting a movement track (MT) or movement circle (MC) of the mobile user;

(4) identifying the remote fixed hosts or routers that are located on the predicted MT or MC within the circularly shaped geographic location; and (5) establishing a mobile floating (MF)-agent for use by the mobile user at each of the identified remote fixed hosts or routers.

18. A method of distributing network services and resources in a wireless local area network having first and second mobile support routers (MSR) and a mobile terminal, the method comprising the steps of:

in the first MSR, creating a first terminal agent (T-agent) for representing the mobile terminal in the wireless local area network;

using the first T-agent to pre-arrange movement of mobile terminal data from the first MSR to the second MSR by requesting that a mobile floating (MF)-agent manager, located in the second MSR, create an MF-agent for the mobile terminal; and handing over representation of the mobile terminal from the T-agent to the MF-agent when the mobile terminal arrives in a service area of the second MSR.

19. The method according to claim 18, wherein the MF-agent manager is supported by a mobile internet protocol (IP) layer of the wireless local area network.

20. The method according to claim 18, wherein the first T-agent manages a cache and mobility information of the mobile terminal.

21. The method according to claim 18 further comprising the step of, upon logging in by the mobile terminal at the service area of the second MSR, causing the MF-agent to act as a second T-agent and to send a message to deactivate the first T-agent.

22. An apparatus for distributing network services and resources in a wireless local area network having first and second mobile support routers (MSR) and a mobile terminal, the apparatus comprising:

in the first MSR, means for creating a first terminal agent (T-agent) for representing the mobile terminal in the wireless local area network;

means for using the first T-agent to pre-arrange movement of mobile terminal data from the first MSR to the second MSR by requesting that a mobile floating (MF)-agent manager, located in the second MSR, create an MF-agent for the mobile terminal; and means for handing over representation of the mobile terminal from the T-agent to the MF-agent when the mobile terminal arrives in a service area of the second MSR.

23. The apparatus according to claim 22, wherein the MF-agent manager is supported by a mobile internet protocol (IP) layer of the wireless local area network.

24. The apparatus according to claim 22, wherein the first T-agent manages a cache and mobility information of the mobile terminal.

25. The apparatus according to claim 22, further comprising means, responsive to logging in by the mobile terminal at the service area of the second MSR, for causing the MF-agent to act as a second T-agent and to send a message to deactivate the first T-agent.

26. A wireless local area network (LAN), comprising:

at least one mobile terminal;

a mobile support router (MSR) connected to the mobile terminal, the MSR including:
  a mobile internet protocol (IP) layer; and
  a mobile floating (MF)-agent manager, supported by the mobile IP layer, and having associated mobile floating (MF)-agents; and at least one fixed host or server connected to the MSR.

27. The wireless LAN according to claim 26, wherein the mobile IP layer includes an indirect transmission control protocol layer for supporting stream oriented end-to-end communication in the wireless LAN.

28. A cellular communications system comprising:

a mobile terminal;

a first base station system including:
  a base station transceiver;
  a base station controller for controlling the base station transceiver;
  means for creating a first terminal agent (T-agent) for representing the mobile terminal in the cellular communications system;
  means for using the first T-agent to monitor traffic between the mobile terminal and the fixed communications network;
  means for using the first T-agent to pre-arrange movement of mobile terminal data from the first base station system to a second base station system by requesting that a mobile floating (MF)-agent manager, located in the second base station system, create an MF-agent for the mobile terminal; and
  means for handing over representation of the mobile terminal from the T-agent to the MF-agent when the mobile terminal arrives in a service area of the second base station system;

a mobile switching center, connected to the first base station system, for controlling calls to and from a fixed communications network;
  means for creating a first terminal agent (T-agent) for representing the mobile terminal in the cellular communications system;
  means for using the first T-agent to pre-arrange movement of mobile terminal data from the first base station system to a second base station system by requesting that a mobile floating (MF)-agent manager, located in the second base station system, create an MF-agent for the mobile terminal; and
  means for handing over representation of the mobile terminal from the T-agent to the MF-agent when the mobile terminal arrives in a service area of the second base station system; and the second base station system.

29. The cellular communications system according to claim 28, wherein the MF-agent includes a set of processes, executing on the second base station system, for communicating and connecting with local resources and for managing a variable replicated secondary data cache on behalf of the mobile terminal.

30. The cellular communications system according to claim 28, wherein the MF-agent includes a set of processes, executing on the second base station system, for communicating and connecting with local resources and for managing a variable replicated secondary data cache on behalf of a user of the mobile terminal.

31. The cellular communications system according to claim 28, wherein the mobile terminal includes a mobile distributed system platform for performing location sensitive information management functions and for performing predictive mobility management functions.

32. The cellular communications system according to claim 28, further comprising a gateway router for coupling the mobile switching center to the fixed communications network, wherein the gateway router includes means for creating a second MF-agent for representing the mobile terminal in the cellular communications system.

33. The cellular communications system according to claim 28, further comprising a gateway router for coupling the mobile switching center to the fixed communications network, wherein the gateway router includes means for creating a second MF-agent for representing a user of the mobile terminal in the cellular communications system.

34. The cellular communications system according to claim 28, wherein the mobile terminal includes a mobile application programmer interface (mobile-API) for providing a common programming interface to mobile applications, the mobile-API including a mobile distributed system platform for managing location-sensitive information, and for performing predictive mobility management functions.

35. A communication network comprising:
  a plurality of servers, the servers being positioned in respective geographical areas and organized in a distributed file system;
  a mobile terminal having means for communicating with the server nearest the mobile terminal, wherein the communicating means accesses application files and data files stored in the servers; and
  a mobile distributed system platform having means for controlling the distributed file system of the servers and means for predicting a next location of a mobile terminal, wherein the controlling means distributes location sensitive information among the servers based on a next location predicted by the predicting means.

36. The communication network of claim 35, wherein the MDSP includes at least one MDSP agent and at least one mobile floating agent (MFA), the MFA is associated with the mobile terminal, and the MDSP agent communicates with and pre-assigns the MFA to at least one of the servers on behalf of the mobile terminal based on the next location predicted by the predicting means.

37. The communication network of claim 36, wherein the MFA is a process executing on a server remote from the mobile terminal that communicates with and pre-connects with a server local to the mobile station and that manages a replicated data cache on behalf of the MDSP agent.

* * * * *